(12) United States Patent
Davis et al.

(10) Patent No.: US 11,262,448 B2
(45) Date of Patent: Mar. 1, 2022

(54) SOFTWARE DEFINED AUTOMOTIVE RADAR

(71) Applicant: UHNDER, INC., Austin, TX (US)

(72) Inventors: Curtis Davis, St. Louis, MO (US); Monier Maher, St. Louis, MO (US); Jean P. Bordes, St. Charles, MO (US); Manju Hegde, St. Louis, MO (US); Otto A. Schmid, Morgantown, WV (US); Raghunath K. Rao, Austin, TX (US); Marius Goldenberg, Austin, TX (US); Aria Eshraghi, Austin, TX (US); Vito Giannini, Austin, TX (US); David S. Trager, Buda, TX (US); Nikhilesh Bhagat, Austin, TX (US); Srikanth Gollapudi, Austin, TX (US); Sundar Govindarajan, Chennai (IN); Steve Borho, St. Charles, MO (US); Jonathan Preussner, Austin, TX (US); Paul W. Dent, Pittsboro, NC (US); Paul Bassett, Austin, TX (US); Stephen W. Alland, Newbury Park, CA (US); Fred Harris, Lemon Grove, CA (US); Wayne E. Stark, Ann Arbor, MI (US); Murtaza Ali, Cedar Park, TX (US)

(73) Assignee: Uhnder, Inc., Austin, TX (US)

(*) Notice: Subject to any disclaimer, the term of this patent is extended or adjusted under 35 U.S.C. 154(b) by 175 days.

(21) Appl. No.: 16/383,950

(22) Filed: Apr. 15, 2019

(65) Prior Publication Data
US 2019/0271776 A1 Sep. 5, 2019

Related U.S. Application Data

(63) Continuation of application No. 15/496,038, filed on Apr. 25, 2017, now Pat. No. 10,261,179, which is a
(Continued)

(51) Int. Cl.
*G01S 13/931* (2020.01)
*G01S 7/02* (2006.01)
*G01S 13/32* (2006.01)

(52) U.S. Cl.
CPC ............ *G01S 13/931* (2013.01); *G01S 7/023* (2013.01); *G01S 13/32* (2013.01);
(Continued)

(58) Field of Classification Search
CPC ...... G01S 13/86; G01S 13/865; G01S 13/867; G01S 13/931; G01S 2013/9357;
(Continued)

(56) References Cited

U.S. PATENT DOCUMENTS 1,882,128 A   10/1932   Fearing
3,374,478 A   3/1968   Blau
(Continued)

FOREIGN PATENT DOCUMENTS

EP   0725480   11/2011
EP   2374217   4/2013
(Continued)

OTHER PUBLICATIONS

Chambers et al., "An article entitled Real-Time Vehicle Mounted Multistatic Ground Penetrating Radar Imaging System for Buried Object Detection," Lawrence Livermore National Laboratory Reports (LLNL-TR-615452), Feb. 4, 2013; Retrieved from the Internet from https://e-reports-ext.llnl.gov/pdf/711892.pdf.
(Continued)

*Primary Examiner* — Peter M Bythrow
(74) *Attorney, Agent, or Firm* — Gardner Linn

(57) ABSTRACT

A radar system has different modes of operation. In a method for operating the radar system, at least one of one or more transmitters are configured to transmit modulated continuous-wave radio signals, while at least one of one or more
(Continued)

receivers are configured to receive radio signals. The received radio signals include the transmitted radio signals transmitted by the one or more transmitters and reflected from objects in the environment. The method further includes selectively modifying an operational parameter of at least one of the transmitters or at least one of the receivers. The selected operational parameter is modified to meet changing operational requirements of the radar sensing system.

19 Claims, 17 Drawing Sheets

Related U.S. Application Data continuation-in-part of application No. 15/481,648, filed on Apr. 7, 2017, now Pat. No. 9,689,967.

(60) Provisional application No. 62/327,003, filed on Apr. 25, 2016, provisional application No. 62/327,016, filed on Apr. 25, 2016, provisional application No. 62/327,006, filed on Apr. 25, 2016, provisional application No. 62/327,015, filed on Apr. 25, 2016, provisional application No. 62/327,004, filed on Apr. 25, 2016, provisional application No. 62/327,003, filed on Apr. 25, 2016, provisional application No. 62/327,018, filed on Apr. 25, 2016, provisional application No. 62/327,005, filed on Apr. 25, 2016, provisional application No. 62/327,017, filed on Apr. 25, 2016, provisional application No. 62/319,613, filed on Apr. 7, 2016.

(52) U.S. Cl.
CPC ............ *G01S 2013/9316* (2020.01); *G01S 2013/9322* (2020.01); *G01S 2013/9323* (2020.01); *G01S 2013/9324* (2020.01)

(58) Field of Classification Search
CPC ....... G01S 2013/936; G01S 2013/9364; G01S 2013/9367
See application file for complete search history.

(56) References Cited

U.S. PATENT DOCUMENTS

| | | | |
|---|---|---|---|
| 3,735,398 A | 5/1973 | Ross | |
| 3,750,169 A | 7/1973 | Strenglein | |
| 3,896,434 A | 7/1975 | Sirven | |
| 4,078,234 A | 3/1978 | Fishbein et al. | |
| 4,176,351 A | 11/1979 | De Vita et al. | |
| 4,566,010 A | 1/1986 | Collins | |
| 4,882,668 A | 11/1989 | Schmid et al. | |
| 4,910,464 A | 3/1990 | Trett et al. | |
| 4,939,685 A | 7/1990 | Feintuch | |
| 5,001,486 A | 3/1991 | Bächtiger | |
| 5,034,906 A | 7/1991 | Chang | |
| 5,087,918 A | 2/1992 | May et al. | |
| 5,151,702 A | 9/1992 | Urkowitz | |
| 5,175,710 A | 12/1992 | Hutson | |
| 5,218,619 A | 6/1993 | Dent | |
| 5,272,663 A | 12/1993 | Jones et al. | |
| 5,280,288 A | 1/1994 | Sherry et al. | |
| 5,302,956 A | 4/1994 | Asbury et al. | |
| 5,341,141 A | 8/1994 | Frazier et al. | |
| 5,345,470 A | 9/1994 | Alexander | |
| 5,376,939 A | 12/1994 | Urkowitz | |
| 5,379,322 A | 1/1995 | Kosaka et al. | |
| 5,497,162 A | 3/1996 | Kaiser | |
| 5,508,706 A | 4/1996 | Tsou et al. | |
| 5,581,464 A | 12/1996 | Woll et al. | |
| 5,654,715 A | 8/1997 | Hayashikura et al. | |
| 5,657,021 A | 8/1997 | Ehsani-Nategh et al. | |
| 5,657,023 A | 8/1997 | Lewis et al. | |
| 5,691,724 A | 11/1997 | Aker et al. | |
| 5,712,640 A | 1/1998 | Andou | |
| 5,724,041 A | 3/1998 | Inoue et al. | |
| 5,847,661 A * | 12/1998 | Ricci ............... G08G 1/096791 340/902 |
| 5,892,477 A | 4/1999 | Wehling | |
| 5,917,430 A | 6/1999 | Greneker, III et al. | |
| 5,920,285 A | 7/1999 | Benjamin | |
| 5,931,893 A | 8/1999 | Dent et al. | |
| 5,959,571 A | 9/1999 | Aoyagi et al. | |
| 5,970,400 A | 10/1999 | Dwyer | |
| 6,067,314 A | 5/2000 | Azuma | |
| 6,069,581 A | 5/2000 | Bell et al. | |
| 6,121,872 A | 9/2000 | Weishaupt | |
| 6,121,918 A | 9/2000 | Tullsson | |
| 6,151,366 A | 11/2000 | Yip | |
| 6,163,252 A | 12/2000 | Nishiwaki | |
| 6,184,829 B1 | 2/2001 | Stilp | |
| 6,191,726 B1 | 2/2001 | Tullsson | |
| 6,288,672 B1 | 9/2001 | Asano et al. | |
| 6,307,622 B1 | 10/2001 | Lewis | |
| 6,335,700 B1 | 1/2002 | Ashihara | |
| 6,347,264 B2 | 2/2002 | Nicosia et al. | |
| 6,400,308 B1 | 6/2002 | Bell et al. | |
| 6,411,250 B1 | 6/2002 | Oswald et al. | |
| 6,417,796 B1 | 7/2002 | Bowlds | |
| 6,424,289 B2 | 7/2002 | Fukae et al. | |
| 6,583,753 B1 | 6/2003 | Reed | |
| 6,614,387 B1 | 9/2003 | Deadman | |
| 6,624,784 B1 | 9/2003 | Yamaguchi | |
| 6,674,908 B1 | 1/2004 | Aronov | |
| 6,683,560 B2 | 1/2004 | Bauhahn | |
| 6,714,956 B1 | 3/2004 | Liu et al. | |
| 6,747,595 B2 | 6/2004 | Hirabe | |
| 6,768,391 B1 | 7/2004 | Dent et al. | |
| 6,865,218 B1 | 3/2005 | Sourour | |
| 6,888,491 B2 * | 5/2005 | Richter ............... G01S 7/40 342/70 |
| 6,975,246 B1 | 12/2005 | Trudeau | |
| 7,119,739 B1 | 10/2006 | Struckman | |
| 7,289,058 B2 | 10/2007 | Shima | |
| 7,299,251 B2 | 11/2007 | Skidmore et al. | |
| 7,338,450 B2 | 3/2008 | Kristofferson et al. | |
| 7,395,084 B2 | 7/2008 | Anttila | |
| 7,460,055 B2 | 12/2008 | Nishijima et al. | |
| 7,474,258 B1 | 1/2009 | Arikan et al. | |
| 7,545,310 B2 | 6/2009 | Matsuoka | |
| 7,545,321 B2 | 6/2009 | Kawasaki | |
| 7,564,400 B2 | 7/2009 | Fukuda | |
| 7,567,204 B2 | 7/2009 | Sakamoto | |
| 7,609,198 B2 | 10/2009 | Chang | |
| 7,642,952 B2 | 1/2010 | Fukuda | |
| 7,663,533 B2 | 2/2010 | Toennesen | |
| 7,728,762 B2 | 6/2010 | Sakamoto | |
| 7,791,528 B2 * | 9/2010 | Klotzbuecher ....... G01S 13/347 342/112 |
| 7,847,731 B2 | 12/2010 | Wiesbeck et al. | |
| 7,855,677 B2 | 12/2010 | Negoro et al. | |
| 7,859,450 B2 | 12/2010 | Shirakawa et al. | |
| 8,019,352 B2 | 9/2011 | Rappaport et al. | |
| 8,044,845 B2 | 10/2011 | Saunders | |
| 8,049,663 B2 | 11/2011 | Frank et al. | |
| 8,059,026 B1 | 11/2011 | Nunez | |
| 8,102,306 B2 | 1/2012 | Smith, Jr. et al. | |
| 8,154,436 B2 | 4/2012 | Szajnowski | |
| 8,212,713 B2 * | 7/2012 | Aiga ............... G01S 17/42 342/52 |
| 8,330,650 B2 | 12/2012 | Goldman | |
| 8,390,507 B2 | 3/2013 | Wintermantel | |
| 8,471,760 B2 | 6/2013 | Szajnowski | |
| 8,532,159 B2 | 9/2013 | Kagawa et al. | |
| 8,547,988 B2 | 10/2013 | Hadani et al. | |
| 8,686,894 B2 | 4/2014 | Fukuda et al. | |
| 8,694,306 B1 | 4/2014 | Short et al. | |
| 8,994,581 B1 * | 3/2015 | Brown ............... G01S 13/931 342/83 |

(56) References Cited

U.S. PATENT DOCUMENTS

| | | |
|---|---|---|
| 9,121,943 B2 | 9/2015 | Stirlin-Gallacher et al. |
| 9,239,378 B2 | 1/2016 | Kishigami et al. |
| 9,239,379 B2 | 1/2016 | Burgio et al. |
| 9,282,945 B2 | 3/2016 | Smith et al. |
| 9,335,402 B2 | 5/2016 | Maeno et al. |
| 9,400,328 B2 | 7/2016 | Hsiao et al. |
| 9,541,639 B2 | 1/2017 | Searcy et al. |
| 9,568,600 B2 | 2/2017 | Alland |
| 9,575,160 B1 | 2/2017 | Davis et al. |
| 9,599,702 B1 | 3/2017 | Bordes et al. |
| 9,689,967 B1 | 6/2017 | Stark et al. |
| 9,720,073 B1 | 8/2017 | Davis et al. |
| 9,720,080 B1* | 8/2017 | Rodenbeck ............... G01S 7/36 |
| 9,753,121 B1 | 9/2017 | Davis |
| 9,753,132 B1 | 9/2017 | Bordes et al. |
| 9,772,397 B1 | 9/2017 | Bordes et al. |
| 9,791,551 B1 | 10/2017 | Eshraghi et al. |
| 9,791,564 B1 | 10/2017 | Harris et al. |
| 9,806,914 B1 | 10/2017 | Bordes et al. |
| 9,829,567 B1 | 11/2017 | Davis et al. |
| 9,846,228 B2 | 12/2017 | Davis et al. |
| 9,869,762 B1 | 1/2018 | Alland et al. |
| 2001/0002919 A1 | 6/2001 | Sourour et al. |
| 2002/0004692 A1 | 1/2002 | Nicosia et al. |
| 2002/0044082 A1 | 4/2002 | Woodington et al. |
| 2002/0075178 A1 | 6/2002 | Woodington et al. |
| 2002/0118522 A1 | 8/2002 | Ho et al. |
| 2002/0130811 A1 | 9/2002 | Voigtlaender |
| 2002/0147534 A1 | 10/2002 | Delcheccolo et al. |
| 2002/0155811 A1 | 10/2002 | Prismantas |
| 2003/0001772 A1 | 1/2003 | Woodington et al. |
| 2003/0011519 A1 | 1/2003 | Breglia et al. |
| 2003/0058166 A1 | 3/2003 | Hirabe |
| 2003/0073463 A1 | 4/2003 | Shapira |
| 2003/0080713 A1 | 5/2003 | Kirmuss |
| 2003/0102997 A1 | 6/2003 | Levin et al. |
| 2003/0164791 A1* | 9/2003 | Shinoda ................. H01Q 25/02 342/70 |
| 2003/0235244 A1 | 12/2003 | Pessoa et al. |
| 2004/0012516 A1 | 1/2004 | Schiffmann |
| 2004/0015529 A1 | 1/2004 | Tanrikulu et al. |
| 2004/0066323 A1* | 4/2004 | Richter .................. G01S 13/22 342/70 |
| 2004/0107030 A1* | 6/2004 | Nishira ................. B60W 50/14 701/36 |
| 2004/0138802 A1 | 7/2004 | Kuragaki et al. |
| 2004/0215373 A1* | 10/2004 | Won ....................... G08G 1/161 701/1 |
| 2005/0069162 A1 | 3/2005 | Haykin |
| 2005/0090274 A1 | 4/2005 | Miyashita |
| 2005/0156780 A1 | 7/2005 | Bonthron et al. |
| 2005/0201457 A1 | 9/2005 | Allred et al. |
| 2005/0225476 A1 | 10/2005 | Hoetzel et al. |
| 2005/0273480 A1 | 12/2005 | Pugh et al. |
| 2006/0012511 A1 | 1/2006 | Dooi et al. |
| 2006/0036353 A1 | 2/2006 | Wintermantel |
| 2006/0050707 A1 | 3/2006 | Sterin |
| 2006/0093078 A1 | 5/2006 | Lewis et al. |
| 2006/0109170 A1 | 5/2006 | Voigtlaender et al. |
| 2006/0109931 A1 | 5/2006 | Asai |
| 2006/0114324 A1 | 6/2006 | Farmer et al. |
| 2006/0140249 A1 | 6/2006 | Kohno |
| 2006/0181448 A1 | 8/2006 | Natsume et al. |
| 2006/0244653 A1 | 11/2006 | Szajnowski |
| 2006/0262007 A1 | 11/2006 | Bonthron |
| 2006/0262009 A1 | 11/2006 | Watanabe |
| 2007/0018884 A1 | 1/2007 | Adams |
| 2007/0018886 A1 | 1/2007 | Watanabe et al. |
| 2007/0096885 A1 | 5/2007 | Cheng et al. |
| 2007/0109175 A1 | 5/2007 | Fukuda |
| 2007/0115869 A1 | 5/2007 | Lakkis |
| 2007/0120731 A1 | 5/2007 | Kelly, Jr. et al. |
| 2007/0132633 A1 | 6/2007 | Uchino |
| 2007/0152870 A1 | 7/2007 | Woodington et al. |
| 2007/0152871 A1 | 7/2007 | Puglia |
| 2007/0152872 A1 | 7/2007 | Woodington |
| 2007/0164896 A1 | 7/2007 | Suzuki et al. |
| 2007/0171122 A1 | 7/2007 | Nakano |
| 2007/0182619 A1 | 8/2007 | Honda et al. |
| 2007/0182623 A1 | 8/2007 | Zeng |
| 2007/0188373 A1 | 8/2007 | Shirakawa et al. |
| 2007/0200747 A1 | 8/2007 | Okai |
| 2007/0263748 A1 | 11/2007 | Mesecher |
| 2007/0279303 A1 | 12/2007 | Schoebel |
| 2008/0088499 A1 | 4/2008 | Bonthron |
| 2008/0094274 A1* | 4/2008 | Nakanishi ............ G01S 13/931 342/91 |
| 2008/0150790 A1 | 6/2008 | Voigtlaender et al. |
| 2008/0180311 A1 | 7/2008 | Mikami |
| 2008/0208472 A1 | 8/2008 | Morcom |
| 2008/0218406 A1* | 9/2008 | Nakanishi ............ G01S 13/345 342/192 |
| 2008/0258964 A1 | 10/2008 | Schoeberl |
| 2008/0272955 A1 | 11/2008 | Yonak et al. |
| 2009/0003412 A1 | 1/2009 | Negoro et al. |
| 2009/0015459 A1 | 1/2009 | Mahler et al. |
| 2009/0015464 A1 | 1/2009 | Fukuda |
| 2009/0027257 A1 | 1/2009 | Arikan |
| 2009/0046000 A1* | 2/2009 | Matsuoka ............ G01S 13/426 342/147 |
| 2009/0051581 A1 | 2/2009 | Hatono |
| 2009/0072957 A1 | 3/2009 | Wu et al. |
| 2009/0073025 A1 | 3/2009 | Inoue et al. |
| 2009/0074031 A1 | 3/2009 | Fukuda |
| 2009/0079617 A1 | 3/2009 | Shirakawa et al. |
| 2009/0085827 A1 | 4/2009 | Orime et al. |
| 2009/0103593 A1 | 4/2009 | Bergamo |
| 2009/0121918 A1 | 5/2009 | Shirai et al. |
| 2009/0212998 A1 | 8/2009 | Szajnowski |
| 2009/0237293 A1 | 9/2009 | Sakuma |
| 2009/0254260 A1* | 10/2009 | Nix ....................... G01S 13/867 701/96 |
| 2009/0267822 A1 | 10/2009 | Shinoda et al. |
| 2009/0289831 A1 | 11/2009 | Akita |
| 2009/0295623 A1 | 12/2009 | Falk |
| 2010/0001897 A1 | 1/2010 | Lyman |
| 2010/0019950 A1 | 1/2010 | Yamano et al. |
| 2010/0039311 A1* | 2/2010 | Woodington ............ G01S 13/34 342/70 |
| 2010/0116365 A1 | 5/2010 | McCarty |
| 2010/0156690 A1 | 6/2010 | Kim et al. |
| 2010/0198513 A1 | 8/2010 | Zeng et al. |
| 2010/0253573 A1* | 10/2010 | Holzheimer ............ G01S 7/40 342/176 |
| 2010/0277359 A1 | 11/2010 | Ando |
| 2010/0289692 A1 | 11/2010 | Winkler |
| 2011/0006944 A1 | 1/2011 | Goldman |
| 2011/0032138 A1 | 2/2011 | Krapf |
| 2011/0074620 A1 | 3/2011 | Wintermantel |
| 2011/0187600 A1 | 8/2011 | Landt |
| 2011/0196568 A1 | 8/2011 | Nickolaou |
| 2011/0248796 A1 | 10/2011 | Pozgay |
| 2011/0279303 A1 | 11/2011 | Smith, Jr. et al. |
| 2011/0279307 A1 | 11/2011 | Song |
| 2011/0285576 A1 | 11/2011 | Lynam |
| 2011/0291874 A1 | 12/2011 | De Mersseman |
| 2011/0291875 A1* | 12/2011 | Szajnowski ............ G01S 7/36 342/70 |
| 2011/0292971 A1 | 12/2011 | Hadani et al. |
| 2011/0298653 A1 | 12/2011 | Mizutani |
| 2012/0001791 A1 | 1/2012 | Wintermantel |
| 2012/0050093 A1 | 3/2012 | Heilmann et al. |
| 2012/0105268 A1 | 5/2012 | Smits et al. |
| 2012/0112957 A1 | 5/2012 | Nguyen et al. |
| 2012/0133547 A1 | 5/2012 | MacDonald et al. |
| 2012/0173246 A1 | 7/2012 | Choi et al. |
| 2012/0195349 A1 | 8/2012 | Lakkis |
| 2012/0249356 A1 | 10/2012 | Shope |
| 2012/0257643 A1 | 10/2012 | Wu et al. |
| 2012/0314799 A1 | 12/2012 | In De Betou et al. |
| 2012/0319900 A1 | 12/2012 | Johansson et al. |
| 2013/0016761 A1 | 1/2013 | Nentwig |
| 2013/0021196 A1 | 1/2013 | Himmelstoss |
| 2013/0027240 A1 | 1/2013 | Chowdhury |

(56) References Cited

U.S. PATENT DOCUMENTS

| | | |
|---|---|---|
| 2013/0069818 A1* | 3/2013 | Shirakawa ............ G01S 13/347 342/146 |
| 2013/0102254 A1 | 4/2013 | Cyzs |
| 2013/0113647 A1 | 5/2013 | Sentelle et al. |
| 2013/0113652 A1 | 5/2013 | Smits et al. |
| 2013/0113653 A1 | 5/2013 | Kishigami et al. |
| 2013/0135140 A1 | 5/2013 | Kishigami |
| 2013/0169468 A1* | 7/2013 | Johnson ................. G01S 7/003 342/41 |
| 2013/0169485 A1 | 7/2013 | Lynch |
| 2013/0176154 A1 | 7/2013 | Bonaccio et al. |
| 2013/0214961 A1 | 8/2013 | Lee et al. |
| 2013/0229301 A1 | 9/2013 | Kanamoto |
| 2013/0244710 A1 | 9/2013 | Nguyen et al. |
| 2013/0249730 A1 | 9/2013 | Adcook |
| 2013/0314271 A1 | 11/2013 | Braswell et al. |
| 2013/0321196 A1 | 12/2013 | Binzer et al. |
| 2014/0022108 A1 | 1/2014 | Alberth, Jr. et al. |
| 2014/0028491 A1 | 1/2014 | Ferguson |
| 2014/0035774 A1 | 2/2014 | Khlifi |
| 2014/0070985 A1 | 3/2014 | Vacanti |
| 2014/0085128 A1 | 3/2014 | Kishigami et al. |
| 2014/0097987 A1 | 4/2014 | Worl et al. |
| 2014/0111367 A1* | 4/2014 | Kishigami ............ G01S 13/284 342/21 |
| 2014/0111372 A1 | 4/2014 | Wu |
| 2014/0139322 A1 | 5/2014 | Wang et al. |
| 2014/0159948 A1 | 6/2014 | Ishimori et al. |
| 2014/0220903 A1 | 8/2014 | Schulz et al. |
| 2014/0253345 A1 | 9/2014 | Breed |
| 2014/0253364 A1* | 9/2014 | Lee ...................... G01S 13/931 342/70 |
| 2014/0285373 A1 | 9/2014 | Kuwahara et al. |
| 2014/0316261 A1 | 10/2014 | Lux et al. |
| 2014/0327566 A1 | 11/2014 | Burgio et al. |
| 2014/0340254 A1* | 11/2014 | Hesse .................... G01S 13/02 342/173 |
| 2014/0348253 A1 | 11/2014 | Mobasher et al. |
| 2014/0350815 A1* | 11/2014 | Kambe ............... B60W 10/184 701/70 |
| 2015/0002329 A1 | 1/2015 | Murad et al. |
| 2015/0002357 A1 | 1/2015 | Sanford et al. |
| 2015/0035662 A1 | 2/2015 | Bowers et al. |
| 2015/0061922 A1 | 3/2015 | Kishigami |
| 2015/0103745 A1 | 4/2015 | Negus et al. |
| 2015/0198709 A1 | 7/2015 | Inoue |
| 2015/0204966 A1 | 7/2015 | Kishigami |
| 2015/0204971 A1 | 7/2015 | Yoshimura et al. |
| 2015/0204972 A1* | 7/2015 | Kuehnle ............... G01S 13/931 342/156 |
| 2015/0226838 A1* | 8/2015 | Hayakawa ............ G01S 13/86 342/70 |
| 2015/0226848 A1 | 8/2015 | Park |
| 2015/0234045 A1 | 8/2015 | Rosenblum |
| 2015/0247924 A1 | 9/2015 | Kishigami |
| 2015/0255867 A1 | 9/2015 | Inoue |
| 2015/0301172 A1 | 10/2015 | Ossowska |
| 2015/0323660 A1 | 11/2015 | Hampikian |
| 2015/0331090 A1 | 11/2015 | Jeong et al. |
| 2015/0369912 A1* | 12/2015 | Kishigami ............ G01S 13/26 342/113 |
| 2016/0003938 A1* | 1/2016 | Gazit .................... G01S 13/02 342/81 |
| 2016/0003939 A1 | 1/2016 | Stainvas Olshansky et al. |
| 2016/0018511 A1 | 1/2016 | Nayyar et al. |
| 2016/0033631 A1 | 2/2016 | Searcy et al. |
| 2016/0033632 A1 | 2/2016 | Searcy et al. |
| 2016/0041260 A1 | 2/2016 | Cao et al. |
| 2016/0054441 A1* | 2/2016 | Kuo ..................... G01S 13/931 342/73 |
| 2016/0061935 A1* | 3/2016 | McCloskey .......... G01S 7/0234 342/82 |
| 2016/0084941 A1 | 3/2016 | Arage |
| 2016/0084943 A1 | 3/2016 | Arage |
| 2016/0091595 A1 | 3/2016 | Alcalde |
| 2016/0103206 A1* | 4/2016 | Pavao-Moreira ..... G01S 13/345 342/104 |
| 2016/0124075 A1 | 5/2016 | Vogt et al. |
| 2016/0124086 A1 | 5/2016 | Jansen et al. |
| 2016/0131752 A1* | 5/2016 | Jansen ................. G01S 13/343 342/27 |
| 2016/0139254 A1 | 5/2016 | Wittenberg |
| 2016/0146931 A1 | 5/2016 | Rao et al. |
| 2016/0154103 A1 | 6/2016 | Moriuchi |
| 2016/0178732 A1* | 6/2016 | Oka ......................... G01S 7/40 342/82 |
| 2016/0213258 A1 | 7/2016 | Lashkari et al. |
| 2016/0238694 A1 | 8/2016 | Kishigami |
| 2016/0349365 A1 | 12/2016 | Ling |
| 2017/0010361 A1 | 1/2017 | Tanaka |
| 2017/0023661 A1 | 1/2017 | Richert |
| 2017/0023663 A1 | 1/2017 | Subburaj et al. |
| 2017/0074980 A1 | 3/2017 | Adib |
| 2017/0117950 A1 | 4/2017 | Strong |
| 2017/0153316 A1 | 6/2017 | Wintermantel |
| 2017/0219689 A1 | 8/2017 | Hung et al. |
| 2017/0234968 A1 | 8/2017 | Roger et al. |
| 2017/0293025 A1 | 10/2017 | Davis et al. |
| 2017/0293027 A1 | 10/2017 | Stark et al. |
| 2017/0307728 A1 | 10/2017 | Eshraghi et al. |
| 2017/0309997 A1 | 10/2017 | Alland et al. |
| 2017/0310758 A1 | 10/2017 | Davis et al. |
| 2017/0336495 A1 | 11/2017 | Davis et al. |

FOREIGN PATENT DOCUMENTS

| | | |
|---|---|---|
| EP | 2821808 | 7/2015 |
| FR | 2751086 | 1/1998 |
| WO | WO2015175078 | 11/2015 |
| WO | WO2015185058 | 12/2015 |
| WO | WO2016011407 | 1/2016 |
| WO | WO2016030656 | 3/2016 |
| WO | WO2017187330 | 11/2017 |

OTHER PUBLICATIONS

Fraser, "Design and simulation of a coded sequence ground penetrating radar," In: Diss. University of British Columbia, Dec. 3, 2015.

Zhou et al., "Linear extractors for extracting randomness from noisy sources," In: Information Theory Proceedings (ISIT), 2011 IEEE International Symposium on Oct. 3, 2011.

V. Giannini et al., "A 79 GHz Phase-Modulated 4 GHz-BW CW Radar Transmitter in 28 nm CMOS," in IEEE Journal of Solid-State Circuits, vol. 49, No. 12, pp. 2925-2937, Dec. 2014. (Year: 2014).

Óscar Faus García, "Signal Processing for mm Wave MIMO Radar," University of Gavle, Faculty of Engineering and Sustainable Development, Jun. 2015; Retrieved from the Internet from http://www.diva-portal.se/smash/get/diva2:826028/FULLTEXT01.pdf.

* cited by examiner

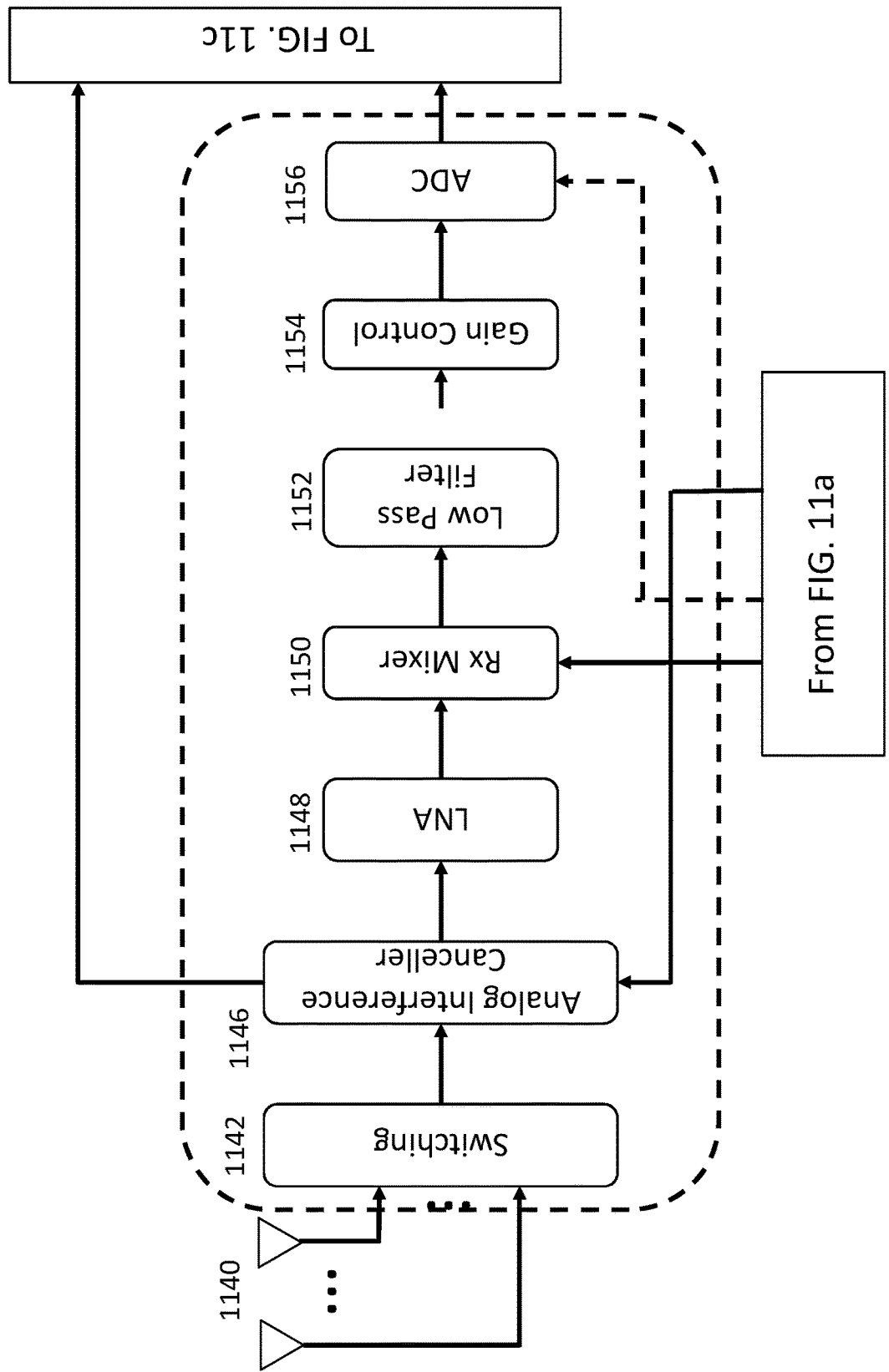

SOFTWARE DEFINED AUTOMOTIVE RADAR

CROSS REFERENCE TO RELATED APPLICATIONS

The present application is a continuation of U.S. patent application, Ser. No. 15/496,038, filed Apr. 25, 2017, now U.S. Pat. No. 10,261,179, which claims the filing benefits of U.S. provisional applications, Ser. No. 62/327,003, filed Apr. 25, 2016, Ser. No. 62/327,004, filed Apr. 25, 2016, Ser. No. 62/327,005, filed Apr. 25, 2016, Ser. No. 62/327,006, filed Apr. 25, 2016, Ser. No. 61/327,015, filed Apr. 25, 2016, Ser. No. 62/327,016, filed Apr. 25, 2016, Ser. No. 62/327,017, filed Apr. 25, 2016, and Ser. No. 62/327,018, filed Apr. 25, 2016; and U.S. patent application Ser. No. 15/496,038 is a continuation-in-part of U.S. patent application, Ser. No. 15/481,648, filed Apr. 7, 2017, now U.S. Pat. No. 9,689,967, which claims the filing benefits of U.S. provisional applications, Ser. No. 62/319,613, filed Apr. 7, 2016, and Ser. No. 62/327,003, filed Apr. 25, 2016.

FIELD OF THE INVENTION

The present invention is directed to radar systems, and in particular to radar systems for vehicles.

BACKGROUND OF THE INVENTION

The use of radar to determine range, velocity, and angle (elevation or azimuth) of objects in an environment is important in a number of applications including automotive radar and gesture detection. A radar typically transmits a radio frequency (RF) signal and listens for the reflection of the radio signal from objects in the environment. A radar system estimates the location and velocity of objects, also called targets, in the environment by comparing the received radio signal with the transmitted radio signal. It would be advantageous to have a radar system that can adapt various aspects of the radar transmitted signal and receiver processing to different environments and different objective functions.

SUMMARY OF THE INVENTION

The present invention provides methods and a radar system that can operate under a variety of environments, a variety of external information, and with a variety of objective functions to modify the transmission and reception processing at a given time to optimize the system with respect to a given objective function. The invention accomplishes better performance by adaptively changing the system including changing the transmitted signal characteristics such as the baseband signal, the bandwidth, the frequency, and the power and the set of transmitting antennas that are used. Better performance is also obtained by changing the receiver processing including the receiving antennas, interference mitigation techniques to be employed, length of time of the signal used to process a received signal to determine range.

A radar sensing system for a vehicle in accordance with an embodiment of the present invention includes at least one transmitter, at least one receiver, at least one antenna, memory, and a control processor. The at least one transmitter is configured for installation and use on a vehicle and is operable to or configured to transmit a radio signal. The at least one transmitter is further operable to transmit radio signals. The transmitted radio signals are generated by up-converting a baseband transmitted signal. The at least one receiver is configured for installation and use on the vehicle and is operable to or configured to receive reflected radio signals. The reflected radio signals are the transmitted radio signals reflected from an object or multiple objects. The radar system includes one or more receivers. In each receiver the received reflected radio signal is down-converted (with in-phase and quadrature signals), and then sampled and quantized using an analog-to-digital converter (ADC) to produce possibly complex baseband samples. The resulting complex signal from the ADC is processed by a digital processor. A control unit is employed to change the characteristics of the transmitted signal and in the way the receiver processes the reflected RF signal to generate estimates of range, velocity, and angle of objects in the environment.

A radar sensing system for a vehicle in accordance with an embodiment of the present invention, the radar sensing system includes a plurality of transmitters, a plurality of receivers, and a control unit. The plurality of transmitters are configured for installation and use on a vehicle, and operable to or configured to transmit modulated radio signals. The plurality of receivers are configured for installation and use on the vehicle, and operable to or configured to receive radio signals. The received radio signals are transmitted radio signals reflected from an object in the environment. Each transmitter of the plurality of transmitters comprises a digital processing unit, a digital-to-analog converter, an analog processing unit, and transmitting antennas. Each receiver of the plurality of receivers comprises a receiving antenna, an analog processing unit, an analog-to-digital converter, and a digital processing unit. The control unit is further operable to or configured to individually modify one or more transmitters of the plurality of transmitters and one or more receivers of the plurality of receivers. The control unit may be operable to or configured to select an operating mode from a single-input, multiple-output (SIMO) mode and a multi-input, multiple-output (MIMO) mode.

These and other objects, advantages, purposes and features of the present invention will become apparent upon review of the following specification in conjunction with the drawings.

BRIEF DESCRIPTION OF THE DRAWINGS

FIGS. 11a, 11b, and 11c are block diagrams illustrating exemplary steps to signal processing in accordance with the present invention;

DESCRIPTION OF THE PREFERRED
EMBODIMENTS

The present invention will now be described with reference to the accompanying figures, wherein numbered elements in the following written description correspond to like-numbered elements in the figures. Methods and systems of the present invention may achieve better performance from a radar system when there is a near object and a far object. Exemplary embodiments of the present invention accomplish better performance by adjusting the radar system to the environment, the objective and inputs external to the radar system. The invention accomplishes better performance by adapting the radar system under software control.

The radar sensing system of the present invention may utilize aspects of the radar systems described in U.S. Pat. Nos. 9,575,160 and/or 9,599,702, and/or U.S. patent applications, Ser. No. 15/416,219, filed Jan. 26, 2017, now U.S. Pat. No. 9,772,397, and/or Ser. No. 15/292,755, filed Oct. 13, 2016, now U.S. Pat. No. 9,753,121, and/or U.S. provisional applications, Ser. No. 62/382,857, filed Sep. 2, 2016, and/or Ser. No. 62/381,808, filed Aug. 31, 2016, which are all hereby incorporated by reference herein in their entireties.

Figure 1:
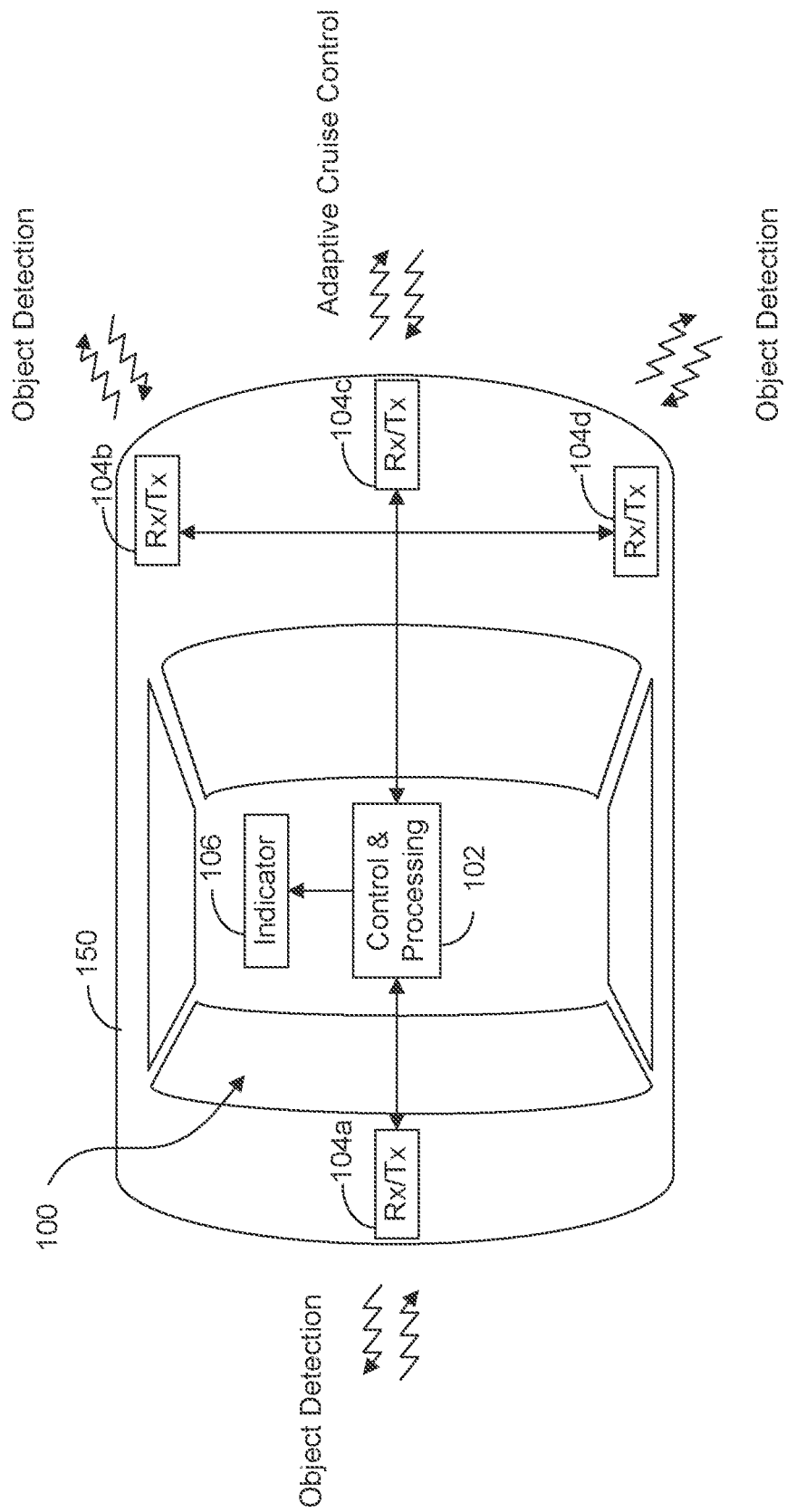
FIG. 1 is a plan view of an automobile equipped with a radar system in accordance with the present invention.

As illustrated in FIG. 1, there may be multiple radars (e.g., 104a-104d) embedded into an automobile. Each of these could employ the ideas contained in the present invention. FIG. 1 illustrates an exemplary radar system 100 configured for use in a vehicle 150. In an aspect of the present invention, a vehicle 150 may be an automobile, truck, or bus, etc. As illustrated in FIG. 1, the radar system 100 may comprise one or more transmitters and one or more virtual receivers 104a-104d, control and processing module 102 and indicator 106. Other configurations are also possible. FIG. 1 illustrates receivers/transmitters 104a-104d placed to acquire and provide data for object detection and adaptive cruise control. The radar system 100 (providing such object detection and adaptive cruise control or the like) may be part of an Advanced Driver Assistance System (ADAS) for the automobile 150.

A radar system operates by transmitting a signal and then listening for the reflection of that signal from objects in the environment. By comparing the transmitted signal and the received signal, estimates of the range to different objects, the velocity of different objects and the angle (azimuth and/or elevation) can be estimated.

There are several different types of signals that transmitters in radar systems employ. A radar system may transmit a continuous signal or a pulsed signal. In a pulsed radar system the signal is transmitted for a short time and then no signal is transmitted. This is repeated over and over. When the signal is not being transmitted the receiver listens for echoes or reflections from objects in the environment. Often a single antenna is used for both the transmitter and receiver and the radar transmits on the antenna and then listens to the received signal on the same antenna. This process is then repeated. In a continuous wave radar system the signal is continuously transmitted. There may be an antenna for transmitting and a separate antenna for receiving. One type of continuous wave radar signal is known as frequency modulated continuous wave (FMCW) radar signal. In FMCW the transmitted signal is a sinusoidal signal with varying frequency. By measuring the time difference between when a certain frequency was transmitted and when the received signal contained that frequency the range to an object can be determined.

A second type of continuous wave signal used in radar systems is a phase modulated continuous wave (PMCW) signal. In this type of radar system, the transmitted signal is a sinusoidal signal in which the phase of the sinusoidal signal varies. Typically, the phase during a given time period (called a chip period or chip duration) is one of a finite number of possible phases. A spreading code consisting of sequence of chips, (e.g., +1, +1, -1, +1, -1, . . . ) that is mapped (e.g., +1→0, -1→π) into a sequence of phases (e.g., 0, 0, π, 0, π, . . . ) that is used to modulate a carrier to generate the radio frequency (RF) signal. The spreading code could be a periodic sequence or could be a pseudo-random sequence with a very large period so it appears to be a nearly random sequence. The spreading code could be a binary code (e.g., +1 or -1). The resulting signal has a bandwidth that is proportional to the rate at which the phases change, called the chip rate, which is the inverse of the chip duration. By comparing the return signal to the transmitted signal the receiver can determine the range and the velocity of reflected objects.

Figure 2A:
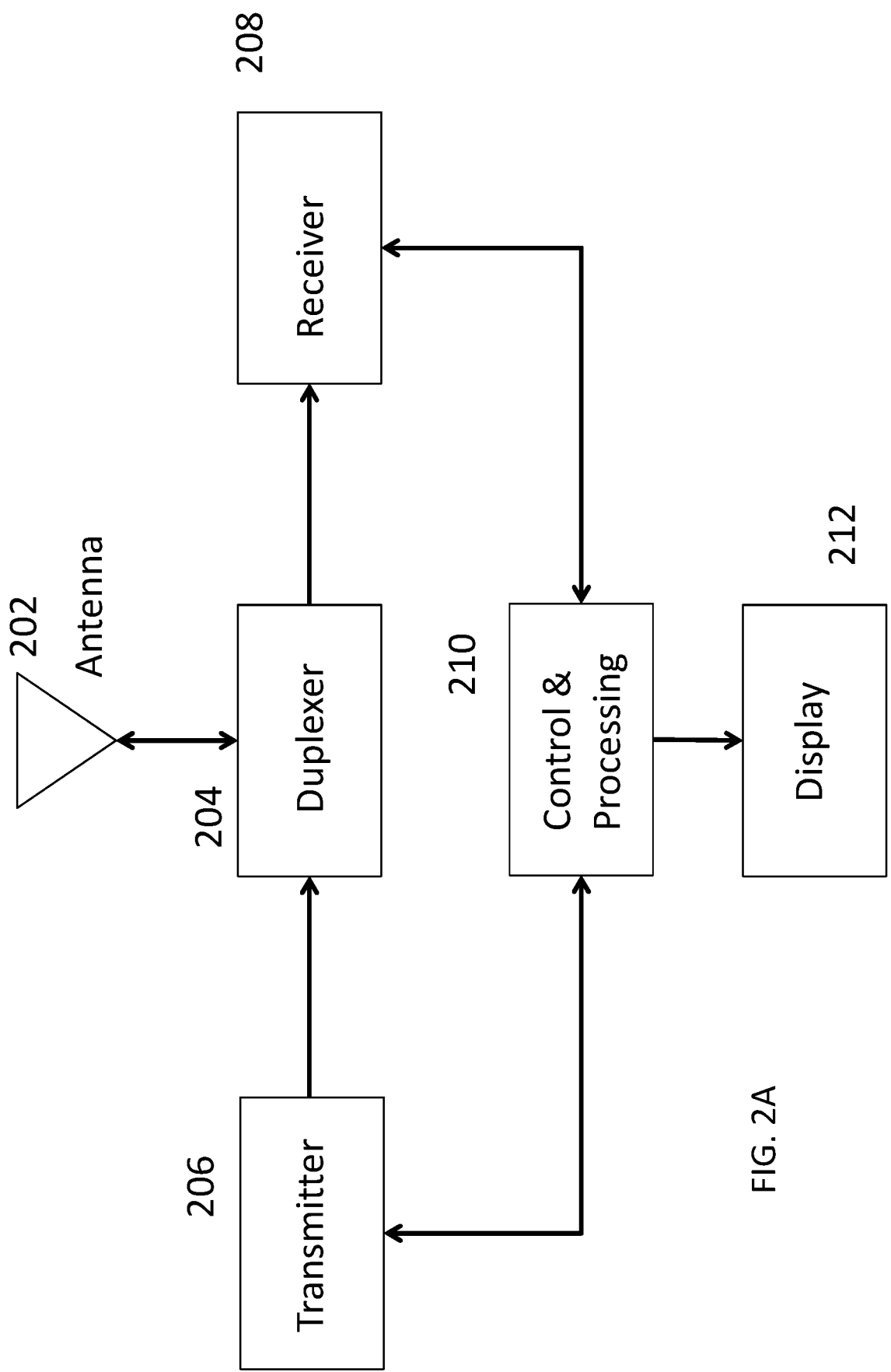
FIGS. 2A and 2B are block diagrams of single transmitter and receiver in a radar system.
Figure 2B:
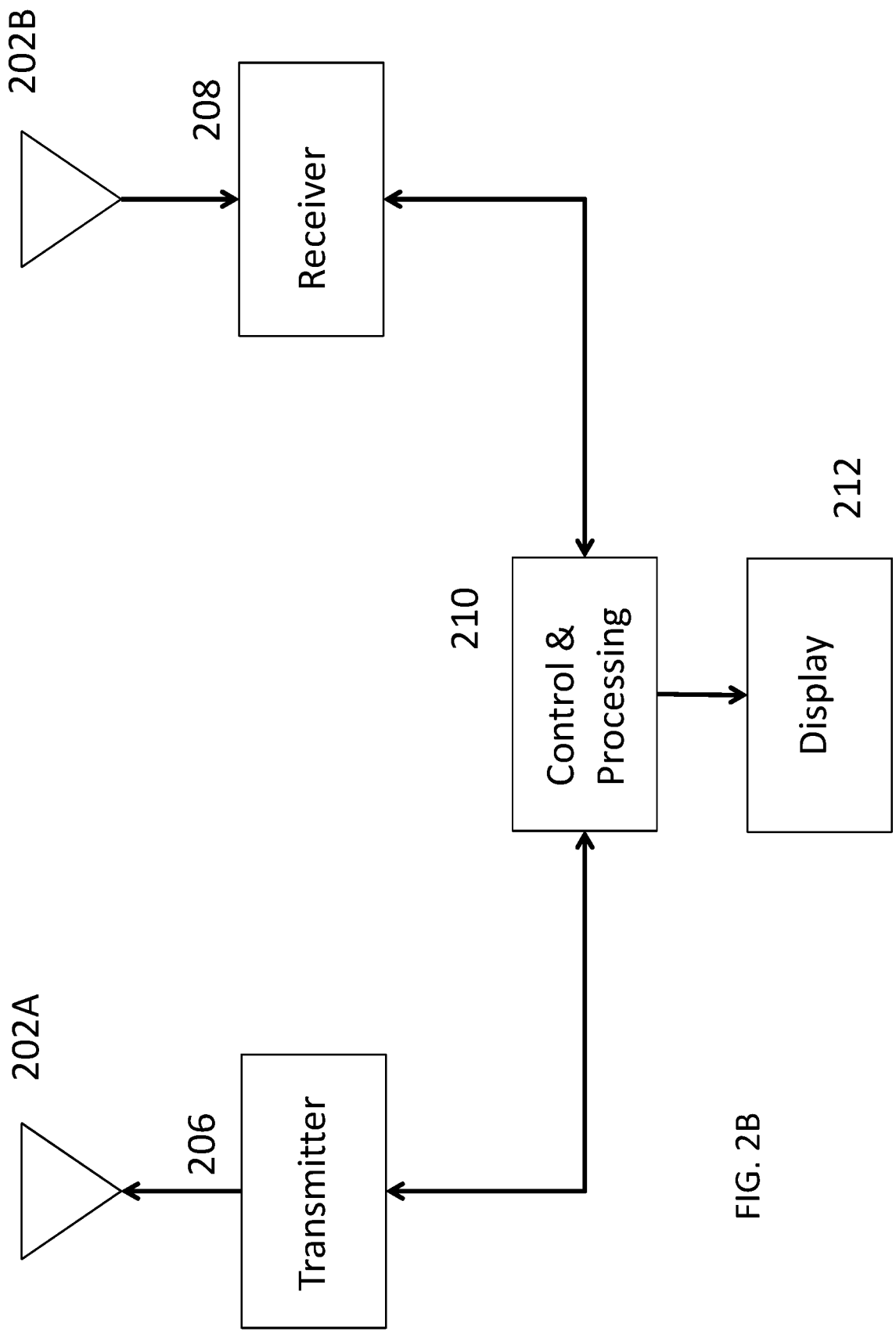

There are several ways to implement a radar system. One way, shown in FIG. 2A uses a single antenna 202 for transmitting and receiving. The antenna is connected to a duplexer 204 that routes the appropriate signal from the antenna to the receiver (208) or routes the signal from the transmitter 206 to the antenna 202. A control processor 210 controls the operation of the transmitter and receiver and estimates the range and velocity of objects in the environment. A second way to implement a radar system is shown in FIG. 2B. In this system there are separate antennas for transmitting (202A) and receiving (202B). A control processor 210 performs the same basic functions as in FIG. 2A. In each case there may be a display to visualize the location of objects in the environment.

Figure 3:
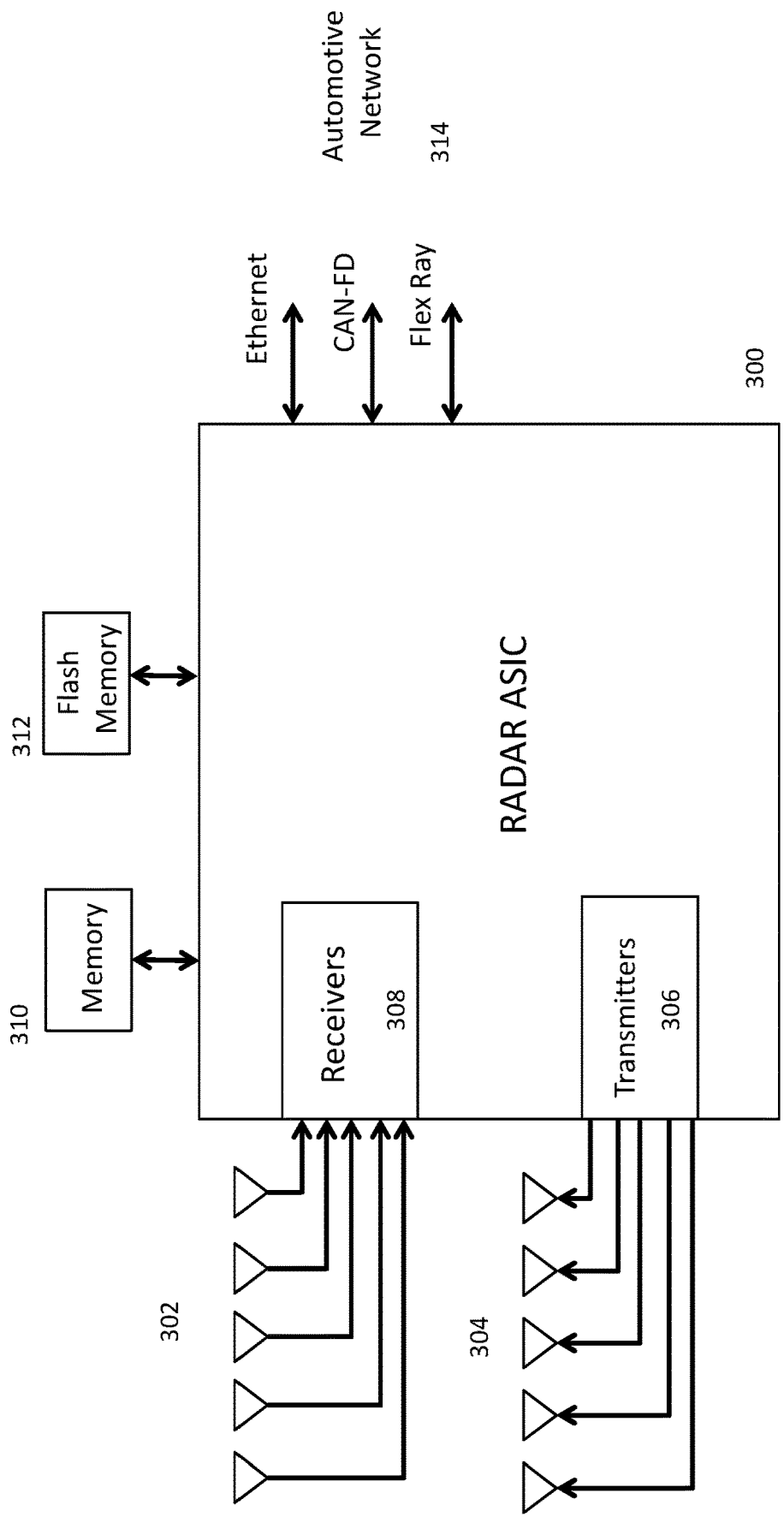
FIG. 3 is a block diagram of multiple transmitters and multiple receivers in a radar system.

A radar system with multiple antennas, transmitters and receivers is shown in FIG. 3. Using multiple antennas allows a radar system to determine the angle (azimuth or elevation or both) of targets in the environment. Depending on the geometry of the antenna system different angles (e.g., azimuth or elevation) can be determined.

The radar system may be connected to a network via an Ethernet connection or other types of network connections 314. The radar system will have memory (310, 312) to store software used for processing the signals in order to determine range, velocity and location of objects. Memory can also be used to store information about targets in the environment.

Figure 4:
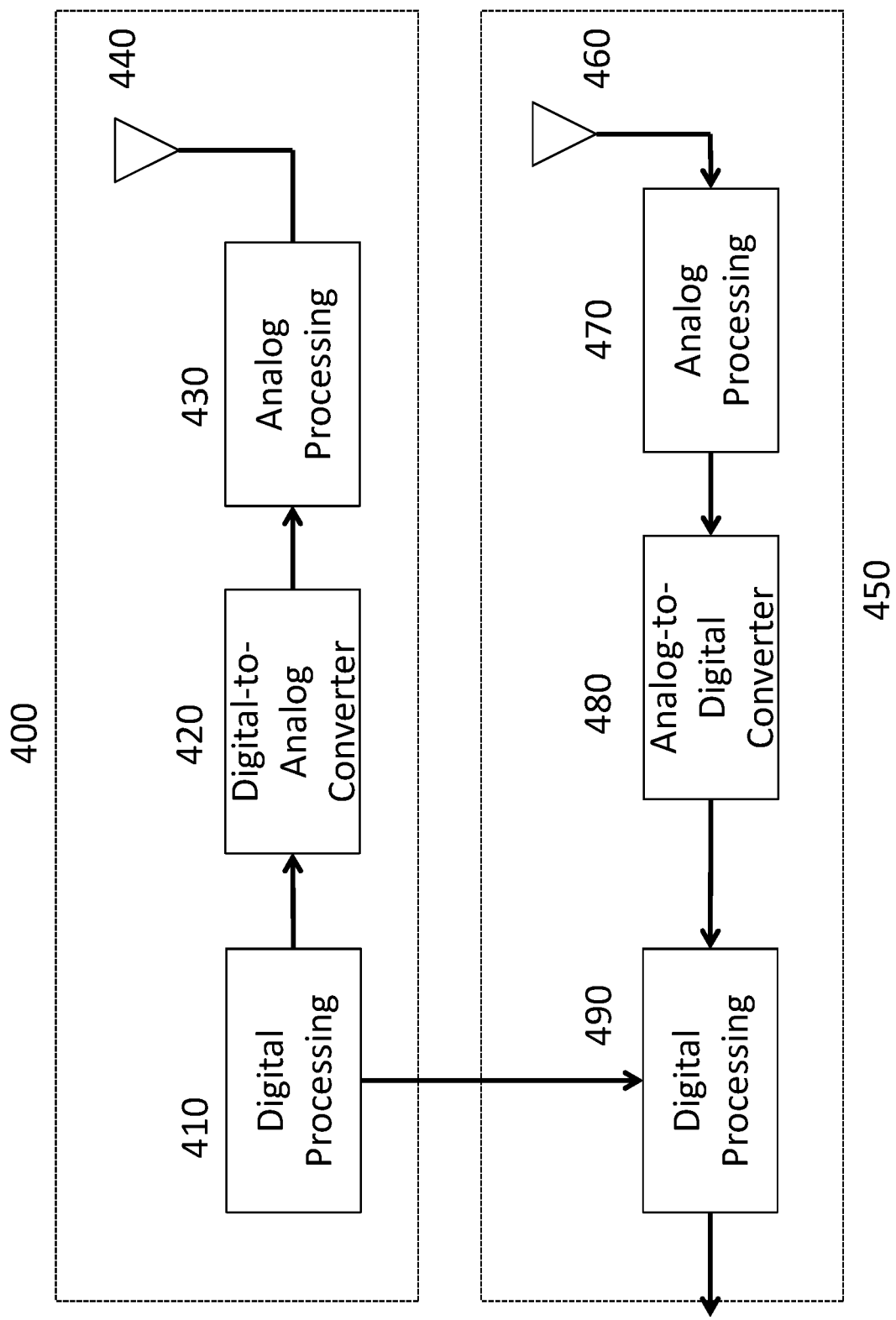
FIG. 4 is a block of a single receiver and single transmitter.

A basic block diagram of a PMCW system with a single transmitter and receiver is shown in FIG. 4. The transmitter 400, as shown in FIG. 4, consists of a digital signal generator 410, followed by a digital-to-analog converter (DAC) 420. The output of the DAC followed is up converted to a RF signal and amplified by the analog processing 430 unit. The result is then used as the antenna 440 input. The digital signal generator generates a baseband signal. The receiver, as shown in FIG. 4, consists of a receiving antenna 460, an analog processing unit that down amplifies the signal and mixes the signal to baseband 470. This is followed by an analog-to-digital converter (ADC) 480 and then digital baseband processing 490. There is also a control processor (not shown) that controls the operation of the transmitter and receiver. The baseband processing will process the received signal and may generate data that can be used to determine range, velocity and angle.

Radars must operate in various environments. For example, an automotive radar must operate in urban areas, suburban areas, rural areas, rain, snow, deserts, parking lots, garages, construction zones, to name a few. Depending on the installation location of the radar in an automobile, the transmitted signal might be reflected off of parts of the automobile. For example, reflections from a bumper in the automobile might create very strong self-interference. The set of environments an automobile is expected to operate in is extensive. Depending on the environment different types of signals might be used. A radar signal appropriate for one environment will not be the best signal to use in a different environment. The receiver processing used will also depend on the environment. The environment might be determined from the radar itself but also could be obtained by the radar from external sources (e.g., other vehicles, cellular networks, GPS).

In addition to operating in multiple environments, radar systems may have different performance objectives. Range resolution, maximum unambiguous range, Doppler resolution, angular resolution, and field of view are some of the objectives of a radar system. The smallest separation of two objects, such that they are recognized as two distinct objects by a radar, is known as the range resolution of the radar. The range resolution is inversely proportional to the bandwidth of the transmitted signal. A short-range radar (SRR) might provide a range resolution that is sub-meter (e.g., less than 5 cm) but only for distances from 0 to less than 30 meters. A long-range radar might have a much larger range resolution. Another performance measure is the maximum unambiguous range, $D_u$. This is the maximum distance of an object such that the distance can be correctly (unambiguously) determined from the received (reflected) signal. If the delay of the reflected signal can be confused with another (shorter) delay due to the period of the transmitted signal, then the distance to the object cannot be unambiguously determined. A long-range radar (LRR) might have a maximum unambiguous range out to several hundred meters whereas a SRR might have an unambiguous range out to several tens of meters.

Doppler resolution refers to the capability of a radar to discriminate the velocity of different targets. There is a maximum Doppler shift that a radar can determine without ambiguity. This is known as the maximum unambiguous velocity. A radar system using multiple antennas can determine the angle of a target relative to some reference in either the horizontal plane (azimuth) or the elevation angle (angle relative to the horizontal plane). A set of angles for which a radar can detect an object is called the field of view. Generally, with a fixed number of antennas, a large field of view would result is less angular resolution while a narrow field of view can provide better angular resolution. With certain antenna configurations, the elevation angle of an object can be determined.

The description herein includes a radar system in which there are $N_T$ transmitters and $N_R$ receivers $N_T \times N_R$ virtual radars, one for each transmitter-receiver pair. For example, a radar system with eight transmitters and eight receivers will have 64 pairs or 64 virtual radars (with 64 virtual receivers). When three transmitters (Tx1, Tx2, Tx3) generate signals that are being received by three receivers (Rx1, Rx2, Rx3), each of the receivers is receiving the transmission from each of the transmitters reflected by objects in the environment. Each of the receivers is receiving the sum of reflected signals due to all three of the transmissions at the same time. Each receiver can attempt to determine the range and Doppler of objects by correlating with delayed replicas of the signal from one of the transmitters. The physical receivers may then be "divided" into three separate virtual receivers, each virtual receiver correlating with a replica of one of the transmitted signals. In a preferred radar system of the present invention, there are 1-4 transmitters and 4-8 receivers, or more preferably 4-8 transmitters and 8-16 receivers, and most preferably 16 or more transmitters and 16-64 or more receivers.

As mentioned earlier, there are various types of signals used in radar systems. A pulsed radar transmits a signal for a short duration of time then turns off the transmitter and listens for reflections. A continuous wave radar transmits a continuous signal. One type of continuous wave radar signal is known as frequency modulated continuous wave (FMCW) signal. The frequency of this signal is varied from some low frequency value to a high frequency value over some time interval and then repeats. Another type of continuous wave radar signal is known as phase modulated continuous wave (PMCW). The phase of the transmitted signal is varied in PMCW. Often the variation of the phase is according to a spreading code. The spreading code may be binary (e.g., +1 and −1) in which case the phase of the transmitted signal at any time takes on one of two possible values (e.g., 0 and π radians). Spreading codes with more than two levels can also be used. Often the code repeats after a certain duration in time duration, sometimes called the pulse repetition interval (PRI). Various types of spreading codes can be used. These include pseudorandom binary sequence (PRBS) codes also called m-sequences, almost perfect autocorrelation sequences (APAS), Golay codes, constant amplitude zero autocorrelation codes (CAZAC) also known as Frank-Zadoff-Chu (FZC) sequences, as well as many other codes that can be used. In a radar system with a single antenna, a single spreading code is used. The autocorrelation of this single code determines the capability of the radar to estimate the range (range resolution and maximum unambiguous range). Codes with good autocorrelation properties include Barker sequences, m-sequences, FZC sequences, and Golay codes. These codes have small sidelobes (the off-center autocorrelation). Codes that have ideal autocorrelation (e.g., Golay codes, CAZAC) can have range sidelobes in the presence of non-zero Doppler shift that will limit the detectability of far targets in the presence of near targets.

In a multiple-input, multiple-output (MIMO) system, there are multiple transmitters that operate simultaneously. Each transmitter uses a spreading code and thus multiple codes are needed, one for each transmitter. In this case (multiple transmitters), codes that have good autocorrelation, as well as good cross correlation properties are desirable. Generally, the better the autocorrelation of codes, the worse the cross correlation properties.

Figure 5:
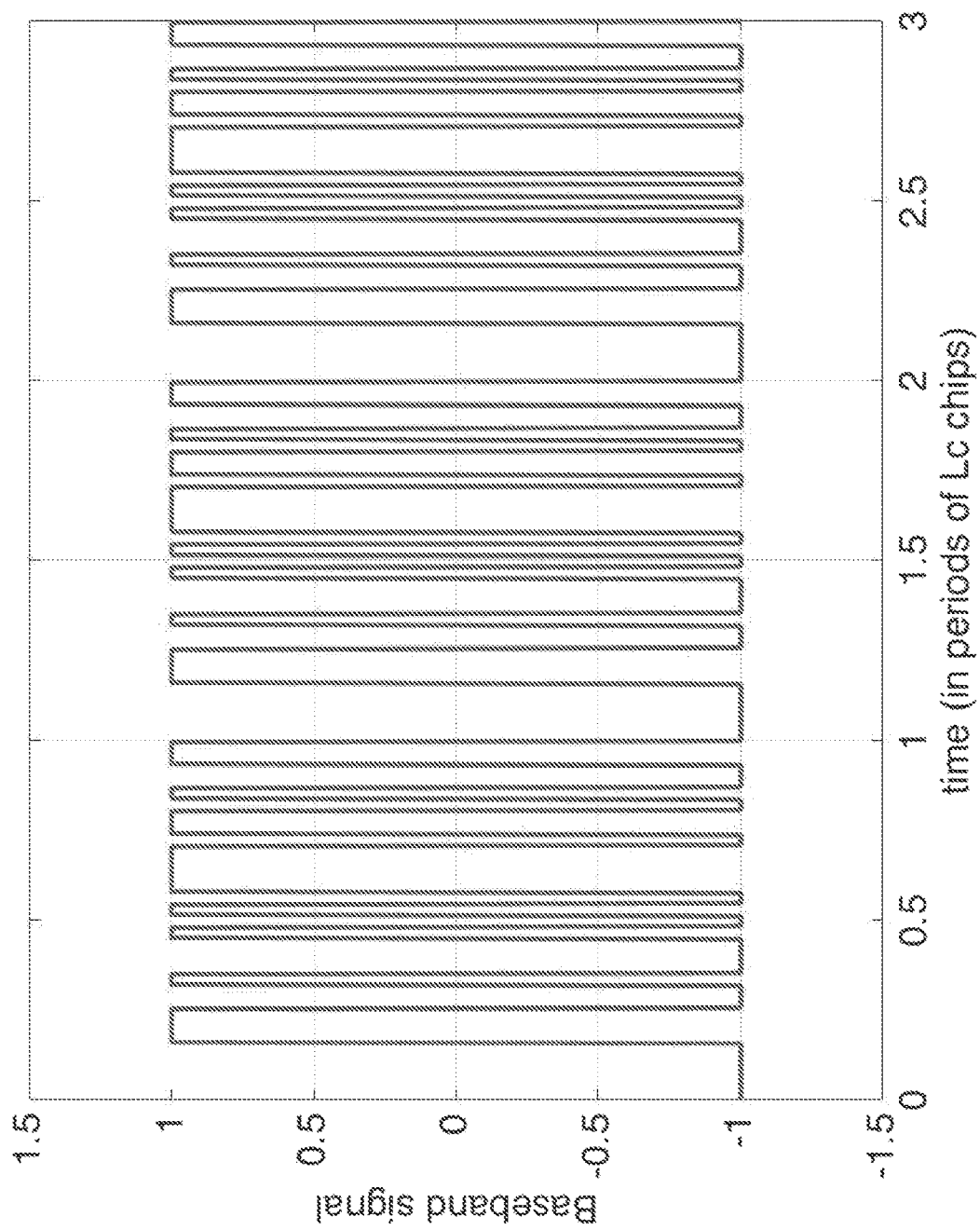
FIG. 5 is a graph illustrating an exemplary transmitted signal using an m-sequence of length 31 in accordance with the present invention.

FIG. 5 shows a baseband signal which has a period of $L_C=31$. The chips in this example are from a maximal length sequence (m-sequence) of length $L_C=31$ generated by an exemplary shift register of length 5. Note that the signal repeats every $L_C$ chips or $L_C T_C$ seconds. The pulse repetition rate is $R_{PR}=1/(L_C T_C)$. The transmitted signal is generated from the baseband signal by modulating the baseband signal onto a carrier frequency to generate a radio frequency signal.

As illustrated in FIG. 4, the received signal is down-converted to a complex baseband signal via an RF front end analog signal processing 470. The analog signal processing involves amplification, mixing with a local oscillator signal, and filtering. The mixing is with two sinusoidal signals that are 90 degrees out of phase (e.g., cosine and sine or in-phase and quadrature-phase signals). After down conversion, the complex analog baseband signal is converted to a complex baseband digital signal by using analog-to-digital converters (ADCs) 480. The complex baseband digital signal (output by the ADCs 480) is then the input to a digital processing unit 490. The digital processing unit 490 performs correlations or matched filtering. The correlators multiply the received complex baseband signal by a delayed replica of the baseband transmitted signal and then the result is accumulated over a certain time interval. A bank of correlators where each correlator has a different delay used for the replica of the baseband transmitted signal will produce a set of correlations that correspond to different ranges of objects. In essence, a correlator that has a particular delay of the baseband transmitted signal is looking for the presence of a reflection from an object at a distance corresponding to the particular delay for the particular correlator, and for which the round-trip delay is the delay used for the baseband transmitted signal.

A matched filter is a device that produces all correlations for all possible delays. That is, the output of the matched filter at a given time corresponds to a correlation with a given delay applied to the transmitted signal when doing the correlation. The matched filter provides all possible correlations. Note that the matched filter should produce a complex output because the input is complex. Alternatively, there could be a filter for the real part of the input and a filter for the imaginary part of the input. A matched filter can also be implemented by a fast Fourier transform (FFT) of the received complex baseband signal and the corresponding transmitted signal, multiplying the results, and then taking an inverse fast Fourier transform (IFFT).

FIG. 5 illustrates a baseband signal which has a period of $L_C$=31. The chips in this example are from a maximal length sequence (m-sequence) of length $L_C$=31 generated by an exemplary shift register of length 5. Note that the signal repeats every $L_C$ chips or $L_C T_C$ seconds. The pulse repetition rate is $R_{PR}$=1/($L_C T_C$). The transmitted signal is generated from the baseband signal by modulating the baseband signal onto a carrier frequency to generate a radio frequency signal.

Figure 6:
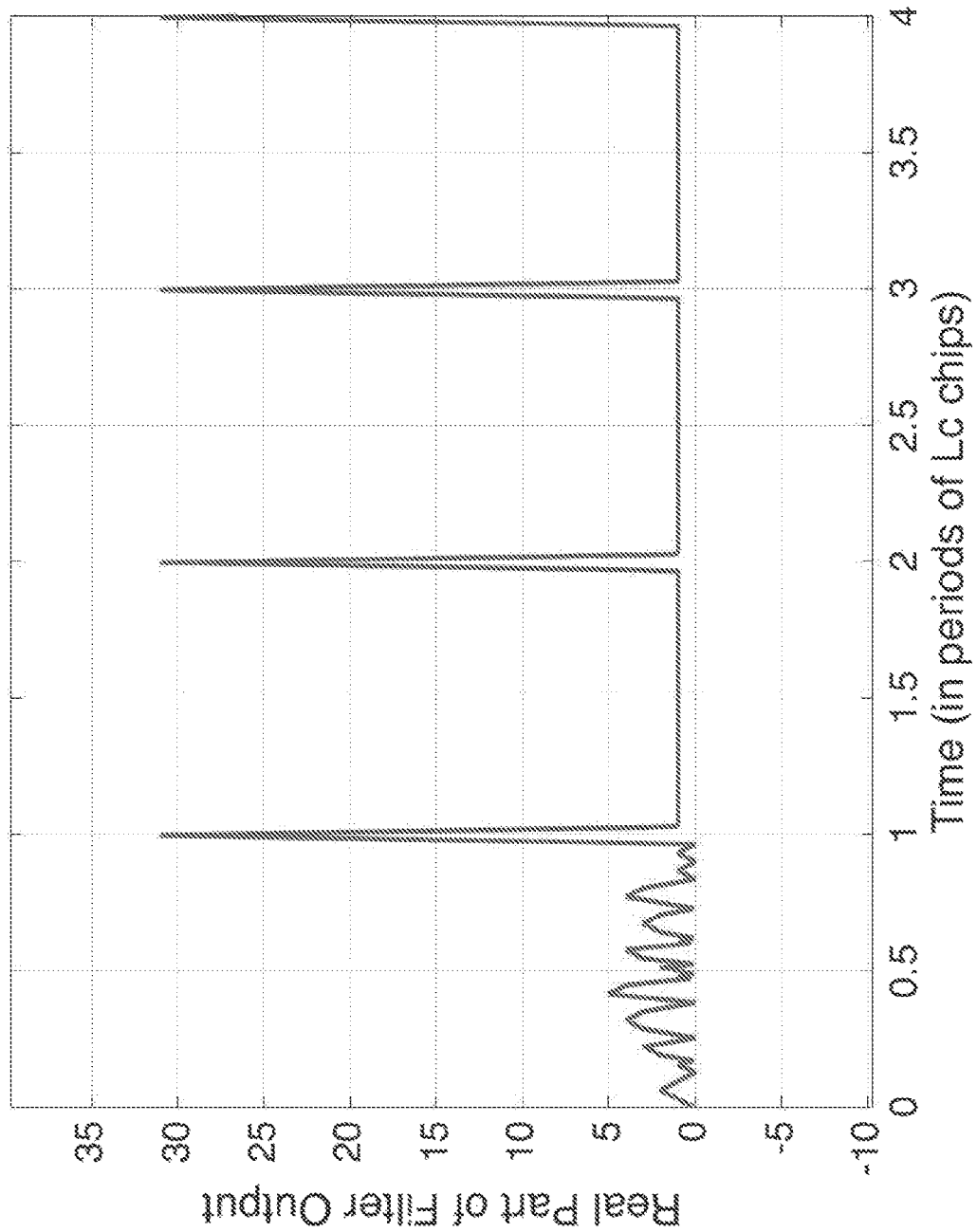
FIGS. 6-9 are graphs illustrating exemplary matched filter outputs over time in accordance with the present invention.

FIG. 6 shows the real part of the output of a matched filter due to the transmitted baseband signal shown in FIG. 5. Here it is assumed the radar started to transmit at time 0 and there is no delay between the transmitter and receiver. That is, there is an object at distance 0. The matched filter output before a full period of the signal is transmitted generates partial correlations. That is, it correlates with only a portion of the code because only a portion of the code has been transmitted. Only after the entire period of the code has been transmitted does the correlation reach a peak. In continuous operation, an object that has a delay of one period of the spreading code will appear to have the same delay as an object at distance 0. Thus, a radar using this system cannot determine whether the delay is 0, one period of the spreading code, two periods of the spreading code, and so on. Therefore, the maximum unambiguous range in this case corresponds to at most one period of the spreading code. A longer spreading code will yield a larger maximum unambiguous range. A delay of τ corresponds to a range of τc/2 where c is the speed of light. The factor of two is because the delay corresponds to the round-trip time from the radar to the target and back to the radar. Here the assumption is that the transmitter and receiver are approximately co-located.

Figure 7:
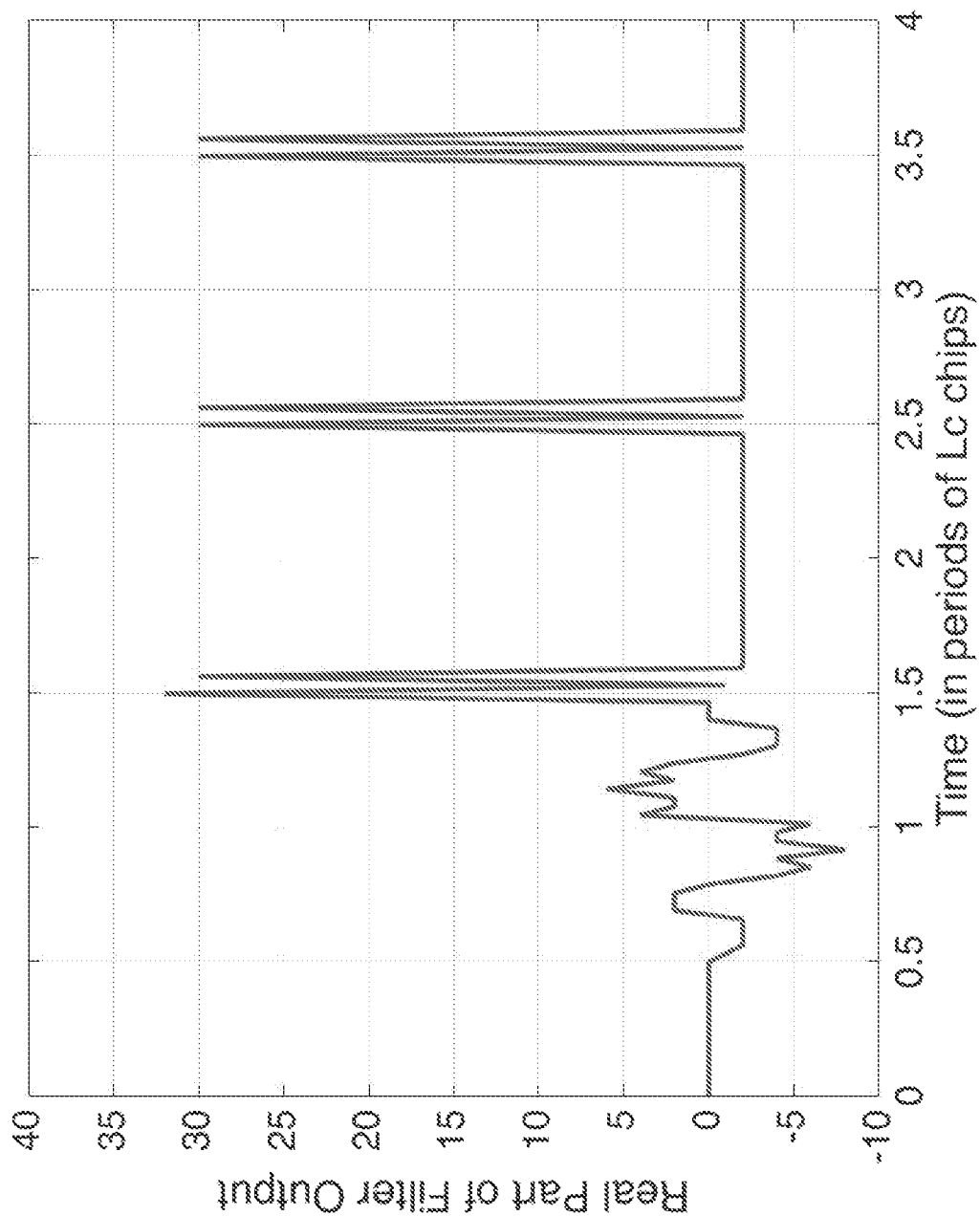

FIG. 7 illustrates the real part of the output of the matched filter when there are two objects that have a differential range delay of 2 chip durations. The filter output shows two distinct peaks in the output of the matched filter.

For PMCW radar systems that utilize nonideal spreading codes and correlate over a certain time interval, the auto-correlation is not ideal. That is, the sidelobes are not zero. The sidelobes of a near target can mask the peak of the correlation for a far object or target because the signal from the near object or target is far stronger than the signal from the far object or target.

Range Estimation

Figure 8:
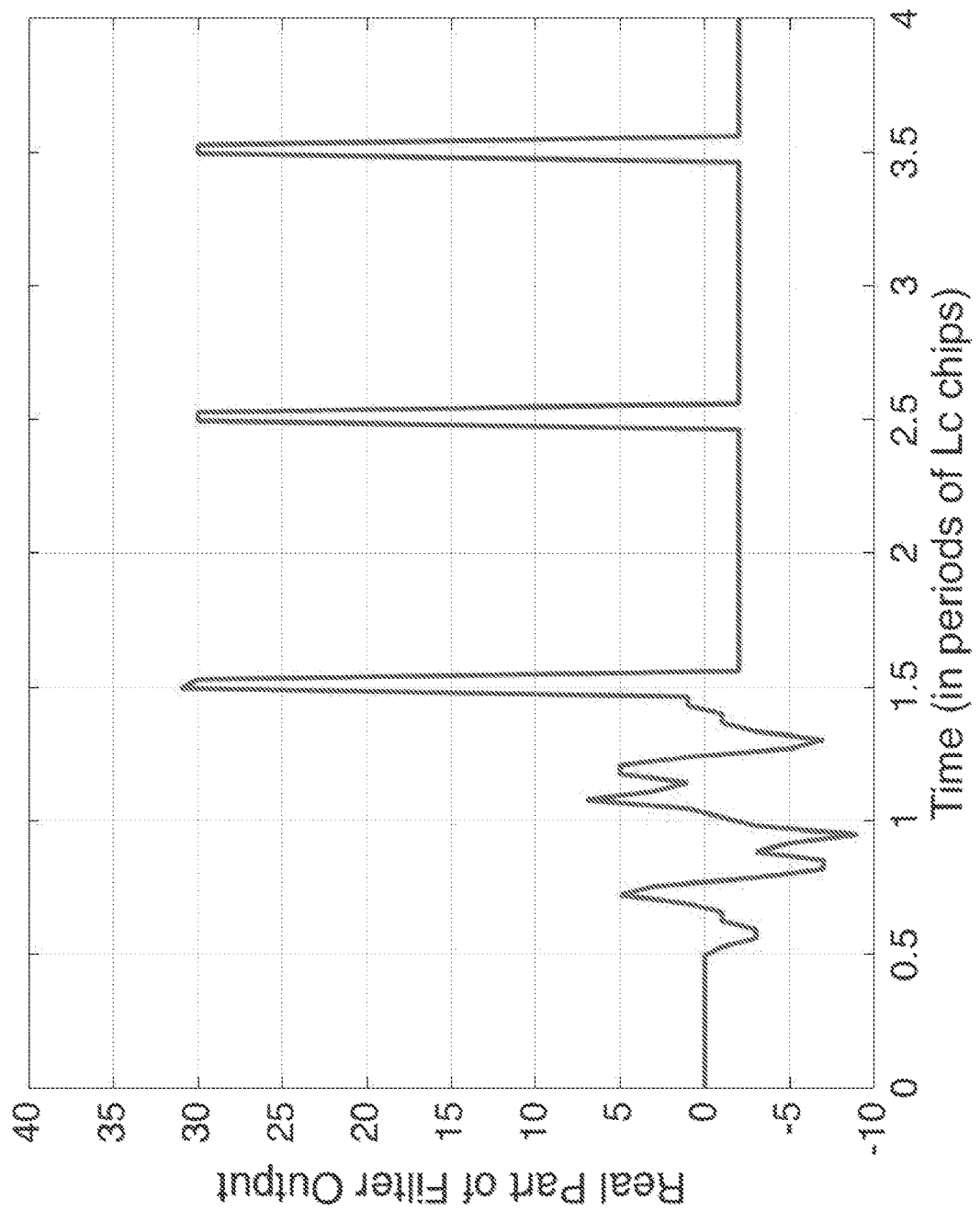

FIG. 8 illustrates the case where the differential round trip delay between two targets is one chip duration. In this case, two objects cannot be distinguished and thus the range resolution of this would correspond to the differential distance corresponding to a duration of half (½) a chip. If Tc denotes the chip duration and Lc denotes the number of chips in one period of the transmitted sequence, then the rate at which the sequence is repeated is Rpr=1/(LcTc), which is sometimes referred to as the pulse repetition rate even though this is a continuous type of signal. If c denotes the speed of light, then the range resolution is given by:

$$D_R=(T_C/2)c=c/(2R_{PR}L_C).$$

If a signal repeats every $T_{PR}$ or at rate $R_{PR}$, then the maximum unambiguous range $D_U$ is:

$$D_U=cT_{PR}/2=(c\ T_C L_C)/2=c/(2R_{PR}).$$

Two targets separated by the maximum unambiguous range will appear to the radar systems as being at the same range. This is sometimes called range aliasing. If the chip duration, $T_C$, is decreased, then the range resolutions would improve proportionally. However, changing the chip duration changes the bandwidth, which might be limited by regulations. If there are 31 chips per period of the spreading code, there are at most 31 different ranges that can be distinguished. As an example, if $T_C$=10 nanoseconds (a chiprate of 100 Mchips/second), then the range resolution would be limited to 1.5 meters. That is, two objects separated by less than 1.5 m would cause reflected signals to be less than a chip duration apart in delay. For this example, the maximum unambiguous range would be 46.5 m. That is, an object at a distance of 46.5 m would cause a reflected signal to have a delay exactly equal to the period of the signal and thus would appear as an object at a distance of 0 m. A longer spreading code would provide for a larger unambiguous range. For example, a spreading code of length 1023 would provide a maximum unambiguous range of about 1,534 m.

Velocity Estimation

Another goal of an exemplary radar system is to estimate the differential velocity between the radar system and a target. Because targets in the environment, or the radar itself, are moving, the signal reflected from an object will not have the same frequency as the transmitted signal. This effect is known as the Doppler Effect and can be used to determine the relative velocity of targets in the environment. Suppose the differential (radial) velocity of the target relative to the radar system is Δv and the carrier frequency is $f_C$. Then, the Doppler frequency shift is $f_D$=2ΔV $f_C$/c. This is because there is a Doppler shift of ΔV$f_C$/c between the radar transmitter and the target and then an additional ΔV$f_C$/c Doppler shift of the reflected signal from the target to the radar receiver. For example, a carrier frequency of 79 GHz with a differential velocity of 300 km/hour=83.3 m/s would result in a frequency shift of about 44 kHz. A frequency shift of $f_D$ corresponds to a differential velocity of ΔV=($f_D$)c/(2 $f_C$).

Figure 9:
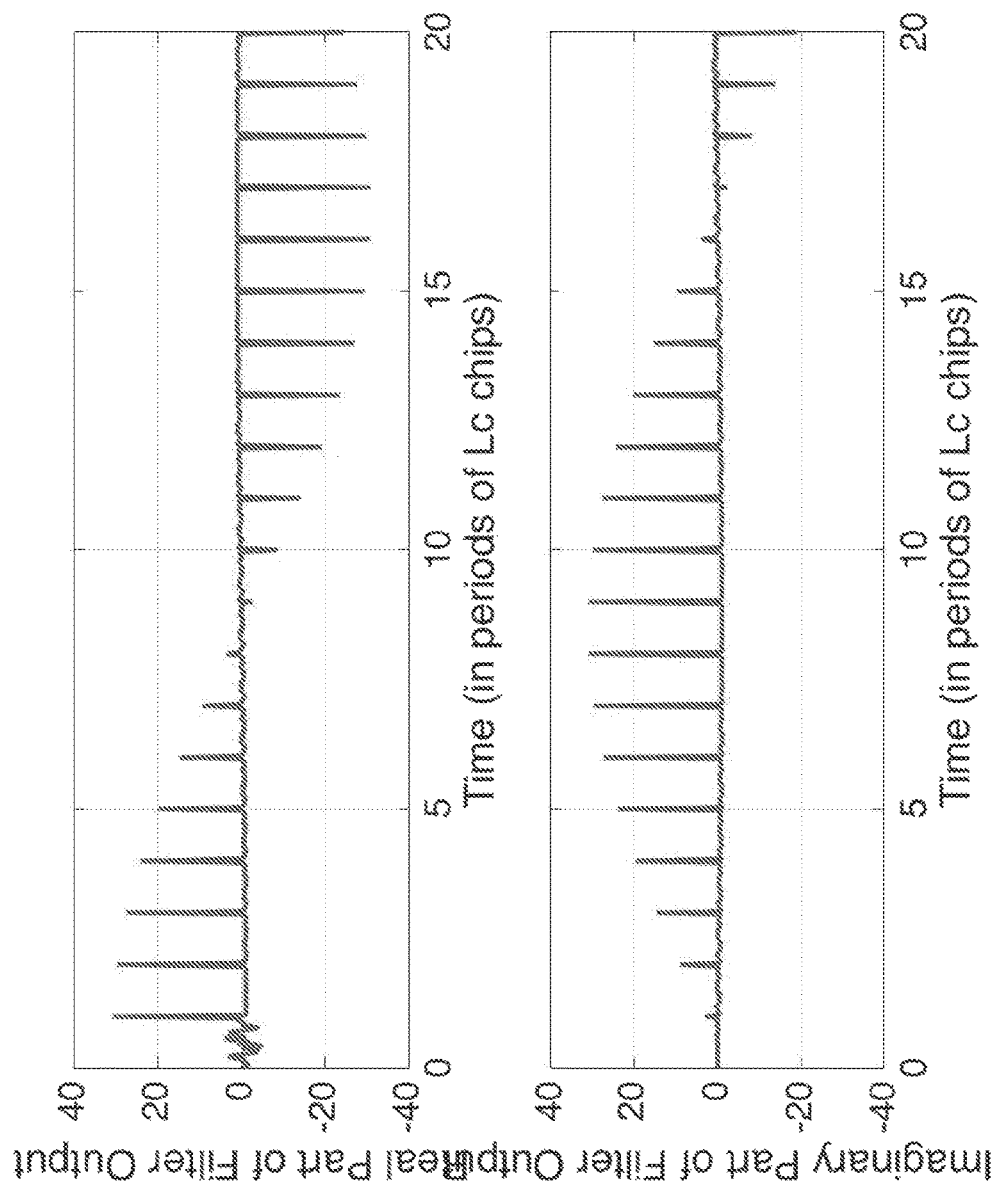
Figure 10:
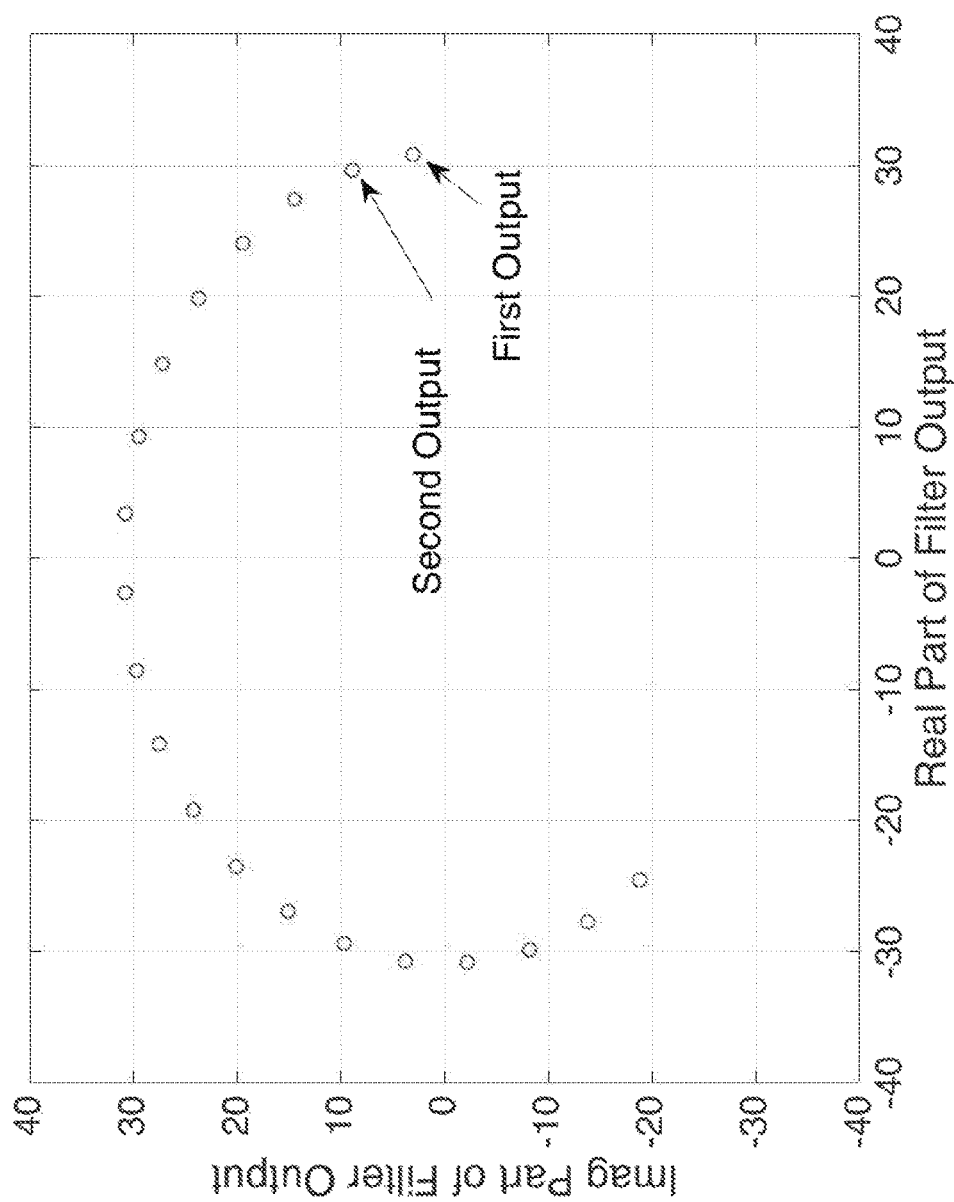
FIG. 10 is a graph illustrating an exemplary imagery part of filter output vs a real part of filter output in accordance with the present invention.

Suppose that a signal, for example an m-sequence, is repeated N times. This is called a scan. The period of the signal is $L_C T_C$. The time duration of the scan is $N*L_C T_C$. During each repetition, a correlation with a spreading code with a given delay (e.g., corresponding to the delay with a given target) is calculated. This correlation calculation generates a complex number for a given delay and this repeats N times during a scan. The N complex numbers can be used to determine the Doppler frequency shift at the given delay. In the absence of Doppler frequency shift the complex correlation values will be constant. In the presence of a Doppler shift the complex correlation values will rotate. The rate of rotation will be related to the Doppler frequency. FIG. 9 illustrates the real and imaginary parts of the matched filter output when there is a Doppler shift. FIG. 10 illustrates the complex values at the peak correlation outputs. As can be seen, the matched filter output is rotating around a circle. The rate of rotation is a measure of the Doppler frequency. Knowing the Doppler frequency allows a calculation of the relative velocity of a target.

One way to estimate the Doppler frequency is to use a fast Fourier transform (FFT) on the complex samples. With this approach to estimating the frequency shift due to Doppler, with N points as the input to the FFT, there will also be N frequency points generated. The frequency resolution possible is over the range of frequencies from a negative frequency of $-R_{PR}/2$ to a positive frequency $+R_{PR}/2$ or a range of $R_{PR}$. Thus, the spacing between frequency points will be $f_R=R_{PR}/N$. This is the frequency resolution. This corresponds to a velocity resolution of:

$$V_r = c\, R_{pr}/(2 f_c N).$$

If the complex correlation samples are produced at a rate of $R_{PR}=1/T_{PR}=1/L_C T_C$, then the frequency range that those points represent is limited to $-R_{PR}/2$ to $+R_{PR}/2$. Thus, the maximum unambiguous differential frequencies $f_u$ that can be represented is given by $-R_{pri}/2 < f_u < +R_{pri}/2$. When this is converted to velocity, the result is that the maximum unambiguous velocity is limited to values in the interval shown below:

$$-c R_{PR}/(4 f_C) < V_U < +c R_{PR}/(4 f_C).$$

Increasing the repetition rate increases the maximum unambiguous velocities that can be determined. However, increasing the repetition rate decreases the maximum unambiguous range that can be determined. The product of the maximum unambiguous velocity and maximum unambiguous range is limited as $$-c^2/(8 f_c) < D_u V_u < c^2/(8 f_c)$$

which is independent of the various parameters of the transmitted signal, except the carrier frequency.

The product of the velocity resolution and the range resolution is given as $$D_r V_r = c^2/(4 f_C L_C N)$$

where $L_C$ is the number of chips in a single period of the spreading code and N is the number of points in the FFT used to determine the velocity. For a fixed scan time ($L_C N T_C$) and fixed chip duration Tc, there is a tradeoff between the resolution possible for the range and the resolution possible for the velocity. By increasing N and decreasing $L_C$, the velocity resolution improves at the expense of range resolution. Similarly, decreasing N and increasing $L_C$ will improve the range resolution at the expense of velocity resolution.

In some systems the signal has $L_C$ chips per period but this sequence is repeated M times and the correlation values are accumulated to generate a signal complex sample for a given range. The sequence of such samples is then used for Doppler processing.

The above illustrates a tradeoff between the maximum unambiguous range and the maximum unambiguous velocity that only depends on the carrier frequency. An increased product of unambiguous velocity and range can only be obtained if the carrier frequency is decreased. In some circumstances it might be desirable to obtain a larger unambiguous range at the expense of a smaller unambiguous velocity (or vice versa). Thus, a system that can adjust the repetition frequency of the signal would be able to adjust to different objectives. There is also a tradeoff between range resolution and velocity resolution for a given bandwidth and scan duration. In some situations it would be advantageous to have better range resolution while in other cases it would be beneficial to have better velocity (or Doppler) resolution. Thus, it would be of benefit to be able to adjust the system parameters depending on the objective function of interest to obtain either the best range resolution or the best velocity resolution (with a given fixed time interval for the scan).

As an example, consider a radar system with a desired scan duration (time to produce a velocity estimate) of 0.1 ms (100 scans per second). Suppose the chip rate is fixed at $10^{-8}$ seconds and the carrier frequency is 79 GHz. A spreading code period of 100 chips would allow 1000 repetitions in the scan time. This corresponds to an unambiguous range of 150 m and an unambiguous velocity estimate range of (−950 m/s, +950 m/s). On the other hand, a spreading code period of 1,000 would allow only 100 repetitions of the code in the same time. The unambiguous range would increase to 1,500 m, while the unambiguous velocity would decrease to (−95 m/s, +95 m/s).

At the receiver it is necessary to store the complex outputs of the correlators for different possible ranges and for different receivers. A sequence of N complex samples needs to be stored for a particular range and a particular virtual receiver (a receiver matched to a particular spreading code of a transmitter) in order to determine an estimate of the velocity for an object at a particular range. For example suppose that there are 512 range bins desired to locate potential targets and the number of repetitions of the code is 1024. This would require storing 512×1024 complex numbers with each complex number requiring 4 bytes of storage. This would require more than 2 million bytes of storage per virtual receiver. If there are 4 transmitting antennas and 16 receiving antennas then this would require about 134 Mbytes of storage, much more than is practical with current storage limits integrated onto a chip. On the other hand storing this off chip would require a significant amount of time to transfer data. At a rate of 1600 Mbytes/second only about 12 transfers could happen per second. The number of virtual receivers determines the possible angle resolution. More receivers can provide more angular resolution at the expense of additional storage or at the expense of worse range or velocity resolution. Thus, the storage restrictions limit either the angular resolution, the range resolution, or the velocity resolution.

In addition to the above, interference from other radar systems needs to be accounted for. Interfering radars could be using the same type of signals as the vehicle in which the system of the present invention is installed. It is also possible that the interfering radar system is using a different type of signal (e.g., FMCW vs. PMCW). It would be useful to be able to mitigate in some way the effect of interfering radar systems. Different types of interference will require different mitigation techniques. Mitigation of the effects of interfering systems generally will not be ideal and it is often the case that the mitigation, while reducing the effect of the interference, will also degrade the desired signal in some manner. If no interfering radar system is present, then it would be desirable to not employ the mitigation technique. As such, it would be desirable to have a radar system that can adapt to the environment present.

Figure 11A:
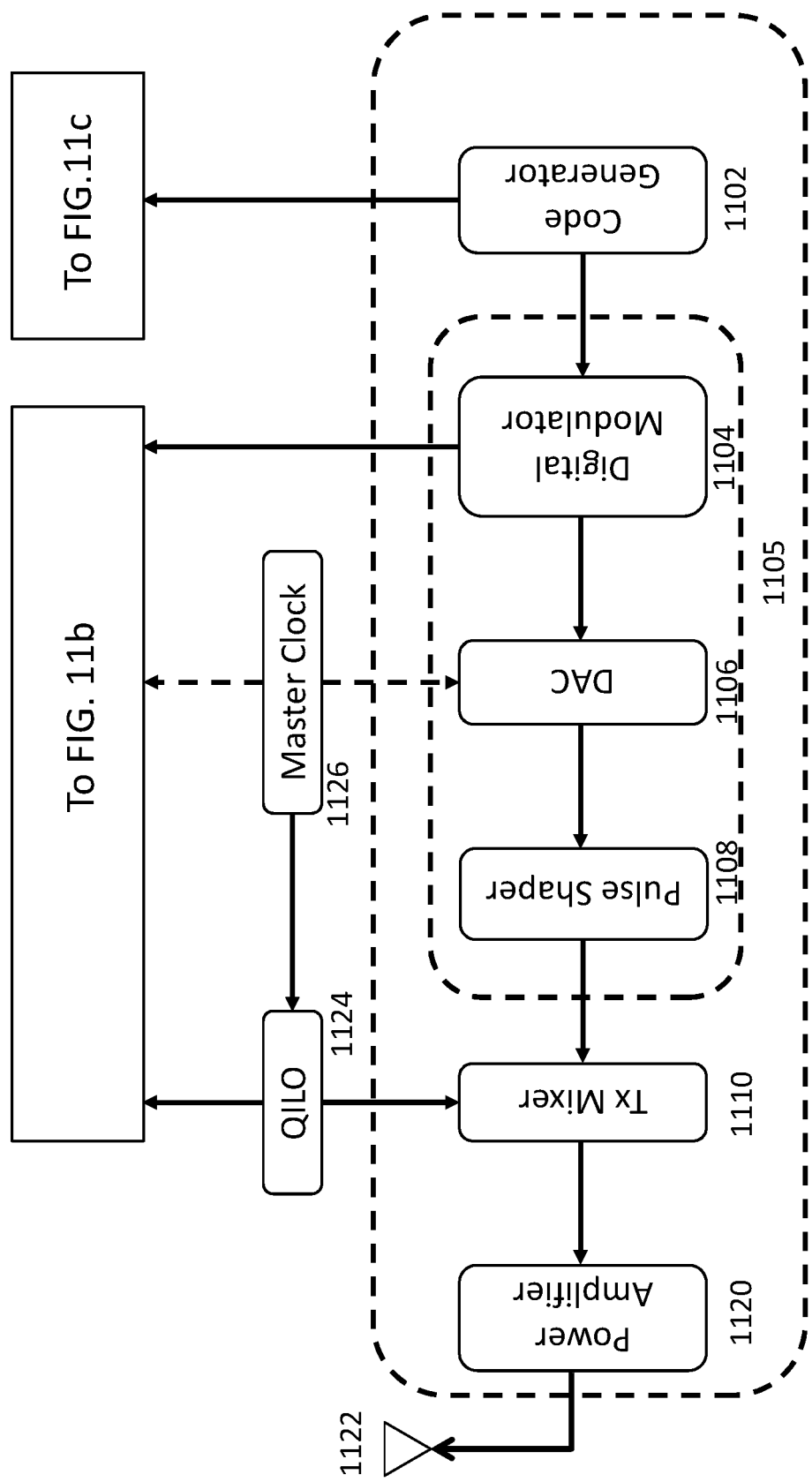
Figure 11C:
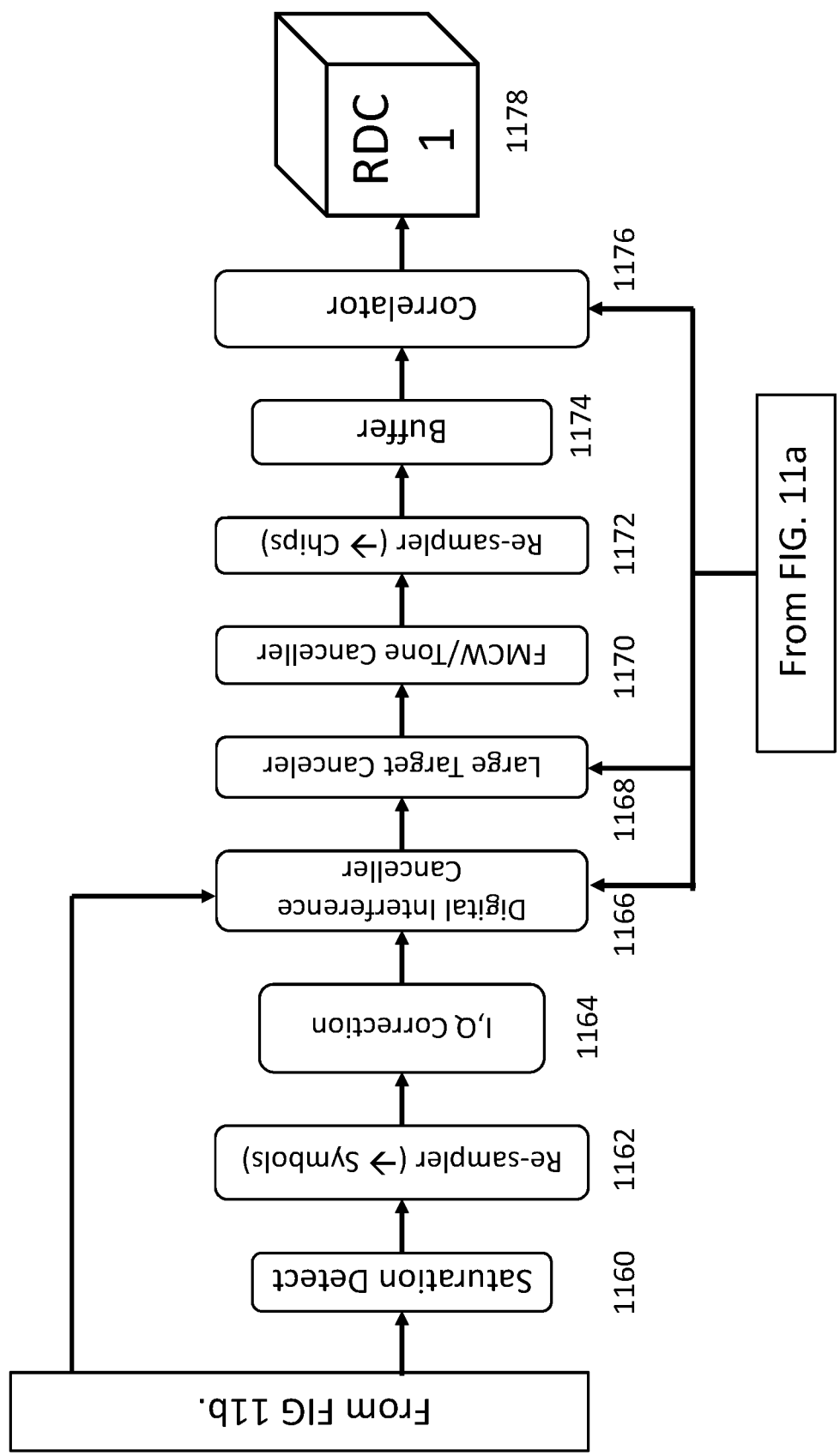

In a preferred embodiment, the processing of the signals is shown in FIGS. 11a, 11b, and 11c. FIG. 11a illustrates exemplary processing modules for a transmitter. A code generator 1102 generates a spreading code. The output of the code generator 1102 is modulated with a digital modulator 1104 to generate a complex baseband signal. The modulation is accomplished in two parts. In the first part the code is mapped to a complex sequence of in-phase and quadrature phase components at the digital modulator 1104. The result is converted to an analog signal by the digital-to analog converter (DAC) 1106. The output is further shaped with a pulse shaper 1108 to generate a complex baseband analog signal. This signal is up-converted with a TX Mixer 1110. An oscillator 1124 is the other input to the mixer to produce a radio frequency (RF) signal. The oscillator signal is also used at the receiver. This is indicated by the connection of the oscillator to components in FIG. 11b. The result of up-conversion is then amplified by a power amplifier 1120 before transmission by an antenna 1122. A master clock 1126 is used to control the timing of the oscillator and to control the timing of the digital circuitry. The master clock 1126 and the oscillator are also shared with the transmitter circuitry shown in FIGS. 11b and 11c. The output of the digital modulator 1104 is shared with the receiver so that the receiver can apply interference cancellation. The output of the code generator 1102 is shared from the transmitter to receiver so appropriate correlation or matched filtering can be applied at the receiver.

FIG. 11b illustrates exemplary analog processing circuitry of the receiver. Various blocks or modules are illustrated. One or more receiving antennas are connected to a switch 1142 that connects one of the antennas 1140 to a receiver. There can be more than one receiver so that different antennas can be connected to different receivers. Not all the antennas need to be connected to a receiver. Because there can be very strong self-interference from the transmitted signal reflecting off of nearby objects (e.g., a bumper), the analog interference cancellation unit 1146 is employed. A signal from the cancellation unit 1146 can be provided to the digital processing where additional interference cancellation can be done. The output of the analog interference cancellation 1146 is provided to a low noise amplifier 1148. The low noise amplifier output is mixed down to baseband by an RF mixer that also uses the oscillator signal (from FIG. 11a). The resulting low pass complex baseband analog signal is filtered (with low pass filter 1152), and further amplified (with gain control 1154) before being converted to a digital signal by an analog-to-digital converter (ADC) 1156. The result of the ADC 1156 is fed to digital processing circuitry shown in FIG. 11c.

FIG. 11c illustrates exemplary digital processing circuitry of the receiver. Various signal processing blocks or modules are illustrated. First, a saturation detection block 1160 detects whether the ADC input has caused the ADC 1156 to saturate. This detection can be used to adjust the gain in the gain control 1154. Next, a change in the sample rate can be performed (1162) to reduce the amount of processing necessary. After resampling, correction for any mismatch in I, Q gain or non-orthogonality can be employed (via I/Q Correction module 1164). Additional interference can be cancelled in a digital interference canceller 1166. Information from the processing done by the analog cancellation unit 1146 can be used (as shown by the connection from FIG. 11b) by the digital interference cancellation unit 1166. This can more accurately (as compared to the analog interference canceller 1146) remove interference from near targets, including the bumper. Further interference cancellation (with large target canceller 1168) can be done to minimize the effect of sidelobes of a near target on the detectability of a further target. Interference from other radar systems, such as an FMCW system, can also be incorporated (such as FMCW/Tone Canceller 1170) into the digital processing. The resulting information is stored in a buffer 1174. This allows all digital processing to be suspended temporarily in order to not create unwanted radio frequency interference from the digital processing. Finally, the signal is processed by correlating with a correlator 1176, with delayed versions of the code from the code generator (1102). The correlator(s) 1176 could be implemented in a number of ways including a matched filter and an FFT-based approach. The samples of the output of the correlator or matched filter (1176) are stored in memory as radar data cubes (RDC), such as RDC1 (1178). The correlation values for different delays, different receivers, and different times are stored in the radar data cube. The information from RDC1 is processed further to determine object velocity and angle (e.g., azimuth or elevation or both). Further software control of the processing of information stored in RDC1 may be performed to determine the velocity of targets.

The analog processing of the received signal from the antenna to the ADC is called the analog front end. The processing of digital signals from the ADC to RDC1 is called the digital front end. The processing of digital signals from the RDC1 to generate Doppler information and angle information is called the digital back end.

Figure 12:
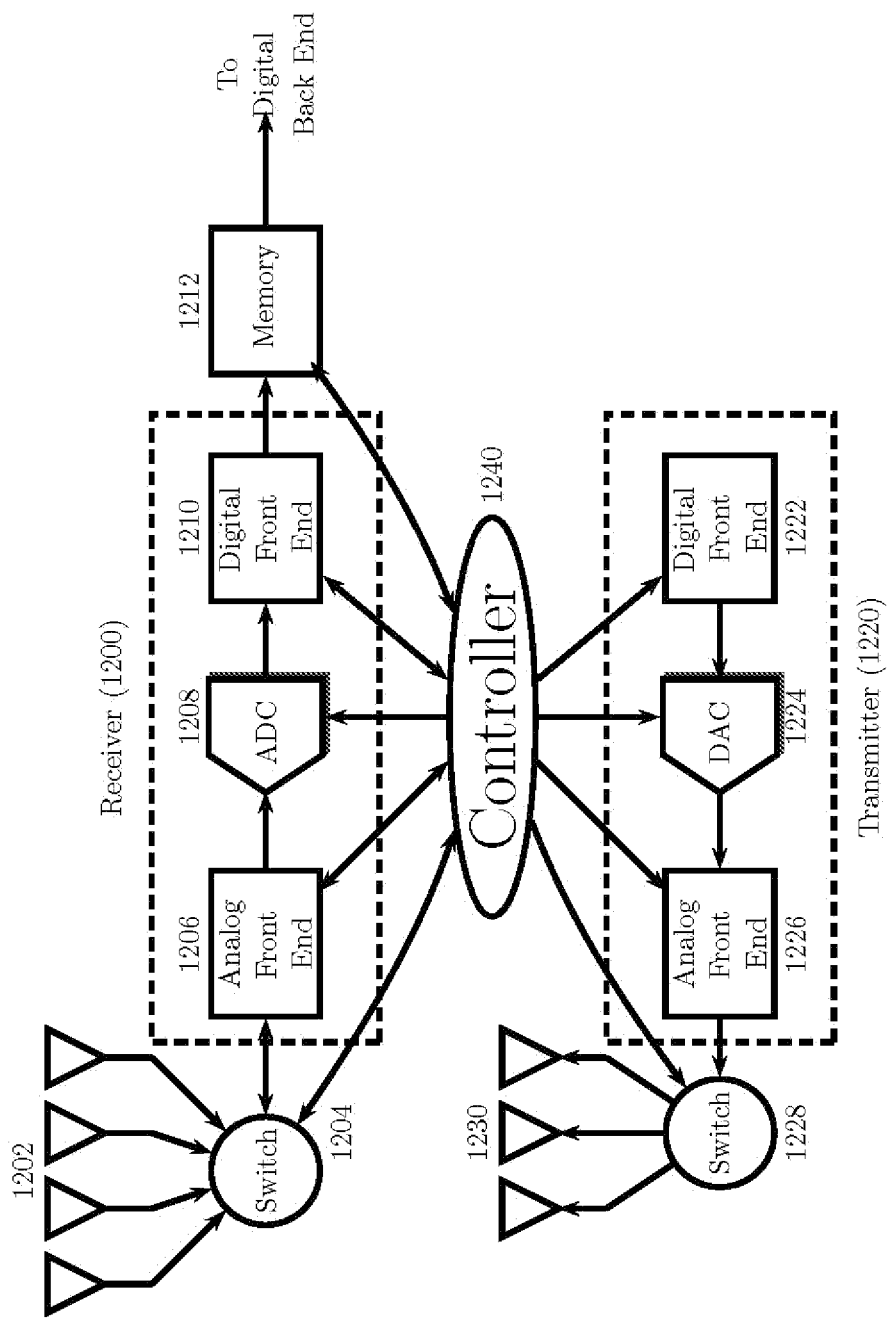
FIG. 12 is a block diagram of an exemplary controller interacting with a receiver and transmitter of a radar system in accordance with the present invention.

As mentioned above, the signals to be used for transmitting, and the receiver processing to be employed, depend on a number of different factors including the environment (e.g., an urban area, suburban area, parking lot, garage, construction zone etc.). Different, changing objectives for the radar system might be desired (e.g., small range resolution, small velocity resolution, small angular resolution, etc.). Different types of interference might be present in the radar system (e.g., FMCW radars, PMCW radars, etc.). Therefore, it is desirable to be able to dynamically adapt the radar to different environments, different performance objectives, and different types of interference. Embodiments of the present invention provide for a software controllable adaptable radar system. An exemplary structure of the radar system is illustrated in FIG. 12. The radar system will have a number of antennas 1202, 1230, transmitters 1220, and receivers 1200. In FIG. 12, a number of antennas 1202 are connected to a switch 1204. The switch 1204 allows the antennas 1202 to be connected to a number of receivers 1200. In FIG. 12, only one receiver 1200 is shown but there could be multiple receivers 1200. A receiver 1200 will have an analog front end 1206, an analog-to-digital converter 1208, a digital front end 1210, and a memory 1212 for storing the results of processing the signal that will be processed by a digital back end. There could be a single analog front end 1206 and a single ADC 1208 with multiple digital front end processing units 1210 and associated memories 1212. In addition, a controller 1240 will be present for controlling the operation of the system. The controller 1240 will also control the digital backend of the system. The controller will comprise a control processor running software and memory storing the control program.

The memory used for the control processor could be part of a larger memory that also stores the information generated by the digital front end 1210. The controller 1240 will control the digital front end 1210 and the analog front end 1226 of the transmitter 1220 and aspects of the analog-to-digital converter 1208.

The radar system will also include a number of transmitters 1220. One such transmitter 1220 is shown in FIG. 12. The transmitter 1220 will consist of a digital front end 1222, a digital-to-analog converter (DAC) 1224 and an analog front end 1226. It is also possible that antennas (1202, 1230) can be used for either transmission or reception (depending on the configuration of the switch(es) (1204, 1228)).

Figure 13A:
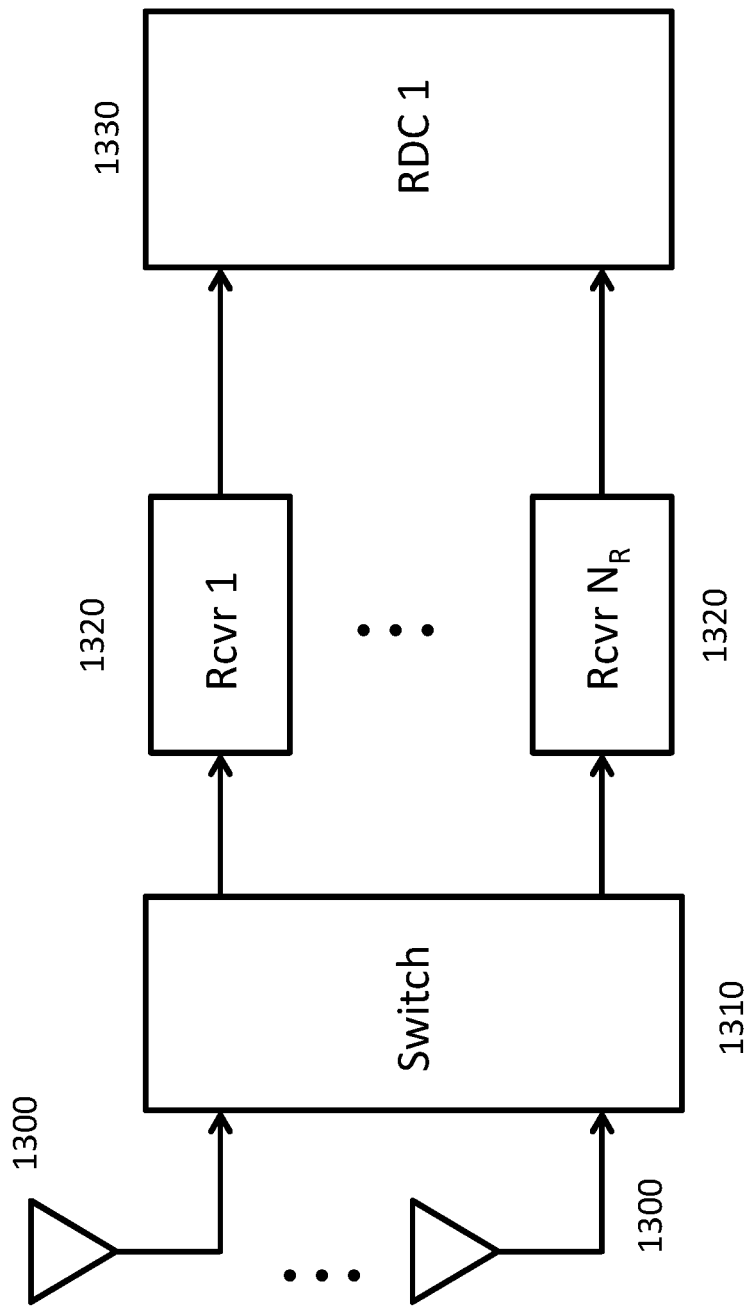
FIGS. 13A and 13B are block diagrams of an exemplary radar system architecture with multiple receivers in accordance with the present invention.
Figure 13B:
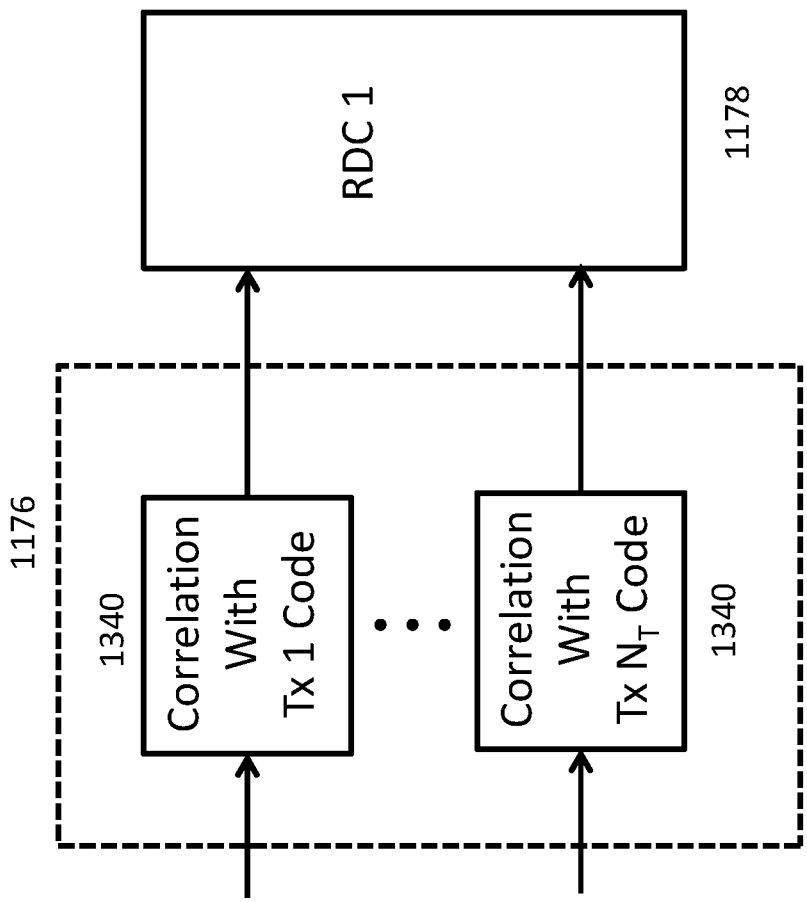

FIGS. 13A and 13B illustrate the radar system architecture with multiple receivers 1320. FIG. 13A illustrates one or more antennas 1300, followed by a switch 1310, followed by NT receivers 1320, that is followed by memory, such as radar data cube 1 (RDC1). The number of receivers 1320 may be different than the number of antennas 1300. For example, a system might have 16 antennas 1300 but only 8 receivers 1320. In this case, 8 of the antennas 1300 are not actually connected to a receiver 1320. The switch 1310 allows for any of the antennas 1300 to be connected to any of the receivers 1320. The radar data cube (1330) stores outputs of each receiver 1320. The outputs are the correlations at a particular delay (range). One dimension of the radar data cube 1330 is the range or delay, a second dimension is the virtual radar (transmitter and receiver code), and a third dimension corresponds to the sequence of complex correlator samples needed to calculate the velocity. For example, a receiver 1320 might correlate with one (or more) delays. The sequence complex correlation values will be stored in RDC1 (1330). Each of the receivers 1320 in FIG. 13A will have an analog front end, an analog-to-digital converter, and a digital front end. The digital front end will, besides providing interference mitigation, perform correlations with the spreading codes of different transmitters. FIG. 13B illustrates an implementation of the correlator block (1176) of FIG. 11c. In FIG. 13B there are correlations performed with different spreading codes corresponding to different transmitters. The correlations can be done in many different fashions, such as with a matched filter that provides correlations with different delays. An FFT approach can also be used whereby the input is transformed to the frequency domain, as is the code. Then, multiplication followed by an inverse FFT operation is performed. Each of these methods produces outputs for multiple delays. Finally, the correlation with a particular transmitter (1340) can be accomplished with a multiply and sum operation where the product of the input signal and a particular delay of the transmitted spreading code is generated and then summed over some window of time. This would be repeated for various delays of the transmitted spreading code and would constitute one of the correlations with TX code blocks (1340) in the receiver.

Self-Interference Mitigation

One aspect of this invention is self-interference cancellation. Self-interference refers to the effect of the signal from one transmitter on the receiver/correlator matched to a second transmitter from the same radar system. U.S. patent application, Ser. No. 15/481,648, now U.S. Pat. No. 9,689,967 ("the '648 patent application", which is incorporated herein by reference in its entirety), describes a method of self-interference mitigation. If there are multiple transmitters generating transmitted signals simultaneously, there will be interference from transmitters to correlators matched to different transmitters. The method in the '648 patent application can be used to mitigate the interference at a receiver matched to one transmitted signal due to signals transmitted by other transmitters (matched to other receivers). In the '648 patent application various modes of operation were considered. In one mode, only a single transmitter was actively transmitting a signal. The receivers determined the effect of this transmitted signal on the output of the receivers matched to other transmitted signals. In a second mode of operation, multiple transmitters are active. Depending on the environment a process of selecting the modes of operation would be appropriate. This method of self-interference mitigation can be controlled by a control processor to determine which mode of operation should be employed and which interference should be mitigated at each receiver.

Other types of self-interference include spillover from a transmitter on a chip to a receiver on the same chip, antenna coupling, and reflections from fascia (e.g., bumpers) that can cause the analog front end of a receiver to operate in saturation. This "desenses" the receiver to the desired signal from targets in the environment. The present invention provides a method for a phase modulated continuous wave (PMCW) system using the advanced temporal knowledge of the code(s) to be transmitted in combination with a bank of digital Finite Impulse Response (FIR) filters to generate complementary signal(s) to the self-interference noise, next convert them to an analog signal with a digital-to-analog converter (DAC), and then subtract the complementary signals at one or more points in the analog receive chain prior to desensing the receiver. This method can provide 20-40 dB of signal reduction. This significantly reduces or eliminates the impact of these self-interference signals on desensing the receiver Variable Gain Amplifiers (VGA).

In addition to desensing the receiver, these self-interfering signals are still typically much larger in comparison to desired radar return signals even after the above signal reduction. These comparatively large self-interference signals continue to cause issues in the digital domain for detection of small targets at longer ranges. This interference degrades the signal-to-noise ratio (SNR) by raising sidelobes in range, Doppler, and angle.

The above analog cancellation method may also be used in the digital domain to recreate the digital version of the self-interference signal(s) with advanced temporal knowledge of the code(s) as inputs to an FIR filter bank and then digitally subtract the estimated interference signal in the digital domain prior to correlation and thereby lowering the impact of these by another 20-40 dB. This interference mitigation technique can be combined with the multi-modal interference mitigation technique described above.

Fascia Reflection Optimization

Integration of a radar system behind a plastic bumper of an automobile, or the fascia, can cause strong reflected signals from the transmitter. The fascia reflection and transmission loss varies greatly depending on the layered composition of the fascia and the frequency of the transmitted wave impinging on it. A radar system that has the ability to shift the carrier frequency of the transmitter and monitor the magnitude of the received signal for the purpose of minimizing the effect of fascia reflection can improve the performance of a radar system. In addition to minimizing the reflection, the frequency vs. reflectivity can be determined and used in self-interference mitigation. The selection of an appropriate carrier frequency is controlled by a search algorithm implemented in hardware or software running on a control processor. Using this, the frequency that provides the maximum sensitivity can be found.

Quadrature Orthonormal Calibration

Another aspect of a radar system that can be controlled by a processor is balancing the in-phase and quadrature mixing process at the receiver. Quadrature receivers rely on perfectly orthonormal signal processing paths, one for the I channel, and the other for the Q channel. Practical implementation of the two paths suffers from both magnitude (gain) and phase inaccuracies. The gain or amplitude mismatch between the I and Q channels is compensated using a method well practiced in the art. The phase mismatch between the I and Q channels, which corresponds to a relative I vs. Q phase different from the desired 90 degrees, is more difficult to compensate and usually requires a significant amount of hardware. The raw input data to the correlators or matched filters needs to be adjusted in regards to gain and amplitude. This is done in subsystem (1164) shown in FIG. 11 as part of the receiver pipeline. In addition, the phase has to be corrected and is also performed in subsystem (1164). Since the analog section performs some automatic gain control, the output of the correlators needs to be adjusted accordingly. The gain control can move the individual correlation values (I or Q) up or down by 1 bit. The gain at any time can be read out from the analog section by the control processor, and that gain number can be applied for the full duration of a correlation ($L_C$ chips). The gain control has to be performed for each physical receiver (for I and Q separately). Based on the binary representation of the gain control, the values are shifted by one to the left or right, or no changes are required.

The multiplication factor is provided by the control processor and will result in a hardware multiply (16 bit). This has to be done for both I and Q. The I/Q correction ensures that the I/Q values are fully orthogonal, and therefore adjusts the angle and amplitude.

The required adjustments can change based on temperature but also based on the iterative decoding adjustments, and therefore these adjustments need to be computed completely (which requires trigonometric functions) and cannot be pre-computed by the control processor. Phase correction is required to compensate for the different wire lengths and antenna mismatch.

The present invention compensates for both the I/Q gain and phase mismatch. This is accomplished by a control processor utilizing the correlation values, input from both the analog processing system and the correlator outputs in order to provide orthogonal and equal gain I and Q channels. Both of these compensation methods can be controlled by the processor running software stored in memory.

Resolving Range and Doppler Aliasing

The present invention also provides a PMCW radar using periodic sequences for pulse compression, which requires many interdependent parameters to be set correctly in order to achieve a particular set of performance requirements. These parameters include the following.
  i. $T_c$—Chip time
  ii. $L_c$—Sequence length, in chips
  iii. M—Number of repetitions of sequence in coherent accumulation to generate a single point for Doppler processing
  iv. N—Number of Doppler sampling points.

The product of these 4 numbers is known as $T_d$, the dwell (or scan) time. The maximum unambiguous distance that can be resolved is $D_u = (c\ T_c\ L_c/2)$. Due to other constraints in the system, which impose limits on $T_d$, M, and N, it is often impractical or impossible to set $T_C$ and $L_C$ large enough to achieve the desired $D_u$. In such cases, targets at a distance D greater than $D_u$ will alias into a range between 0 and $D_u$ that is equal to D modulo $D_u$.

Similar aliasing also happens in Doppler velocity as discussed above. The present invention provides a method for resolving range and Doppler aliasing, comprising:
  a. Performing 2 or more consecutive scans with different $D_u$, e.g.: using a different $L_C$ or $T_C$;
  b. Detecting targets in said scans, and determining aliased range and Doppler velocity for said targets; and
  c. For each detected target in the scans, calculate its expected aliased range (and Doppler) for 0 . . . N levels of folding in every other scan, and select the level of folding for which there is a corresponding detection in all scans.

The above steps are controlled by a processor running software which allows for various unambiguous ranges and unambiguous velocities.

Removing FMCW Interference on Radar

Current FMCW Radars have low capabilities to cancel out other FMCW Radars. Current methods include:
  a. Enabling random frequency sweeps and detection and dropping of scans.
  b. Fixing frequency overlap points by dropping and estimating value.
  c. Typical systems can handle a handful of other interfering radars.

The present invention provides a method of broadband acquisition that enables detection and digital subtraction of the interfering FMCW signals. The implementation uses multiplicity of an adaptive tone tracking system to lock on the largest tones and then sequential digitally cancel them prior to bandwidth compression. The acquisition of interference takes on the order of 10 to 20 samples and are outside of the bandwidth of interest. Once a tracking error is low enough, the interfering signal can be directly subtracted out of the time data stream. After the interfering signals are removed, the signal is filtered and compressed to the desired band. Note, the bandwidth compression naturally enables bit growth of the sampled signal.

The present invention's interference cancelation can be used with either PMCW or FMCW systems. For example, an ADC can sample at 3.5 GHz with 6.2 effective number of bits (ENOB). Typical FMCW systems sample at 10 MHz with 10 ENOB ADC. In accordance with the present invention, the interferers can be subtracted out and then compressed by a factor of 3500/10 or 350× with a real bit growth of 4.2 or total of 10.4 bits without any interference. This exemplary system can track and remove any number (>100) of interferers with little impact to SNR or distortion to existing signals.

PMCW Frequency Scanner

The present invention provides for scanning the available bandwidth and determining a noise floor at each frequency, thereby making it possible to identify low interference sections of the band and to adjust the center frequency and the bandwidth of the radar scan to minimize the impact of the interferers. The present invention includes a processor running software controlling the adjustment of the frequency and the bandwidth of the transmitted signals in a radar system.

Reducing Interference from PMCW to PMCW Radar

PMCW radar relies on the use of PRN sequences to be undetectable to those who do not have the ability to match a received filter to the transmitted waveform. However, there is nevertheless the possibility of interference because of mismatched interference power to desired reflection power. Reducing interference is important since it is expected that the percentage of cars using radar will increase substantially. Mitigating PMCW interference in PMCW radar systems is discussed in U.S. patent Ser. No. 15/416,219, filed on Jan. 26, 2017, now U.S. Pat. No. 9,772,397, where is hereby incorporated by reference herein in its entirety.

To reduce the interference from other automobiles using the PMCW radar of the present invention, the system employs a number of counter-measures. The following is a list of exemplary measurements and counter-measures that the system may employ:

a. Use of outer codes that are orthogonal to transmitted codes for a continuous measurement of interference. Once interference has been determined to be too large, countermeasures for dealing with interferers may be implemented.

b. Offsetting the center frequencies by a certain amount that is larger than the expected signal from the fastest Doppler. For example, if a Doppler of 40 KHz could be expected and a Doppler sampling rate of 120 KHz is selected, separating the center frequencies by 6× the sampling rate will sufficiently decorrelate other interferers. This is accomplished by changing the center frequency of the transmitter and receiver along with randomizing the clocks. For the system of the present invention, the system may have a 10 MHz center frequency selection and may enable 100 PPM crystals for the reference clock. The system can spread the center frequencies between 76 to 81 GHz in 10 MHz increments with a +/−7.9 MHz sub distribution due to the crystals.

c. Scan the entire frequency spectrum and determine where the noise is the lowest and place the next scan in that section.

d. Use many virtual receivers to isolate the interferer into a small angle. The system may increase the number of time interleaved VR's to the maximum to increase isolation.

e. Switch to codes that are more robust to interference such as a pseudorandom binary sequence (PRBS) with randomization. The interfering radars will show up in the noise floor.

f. Use several smaller scans of PRBS or non-identical codes, process each through beamforming and determine which targets are ghosts and which ones are persistent. The ghosts are eliminated and the persistent ones kept.

The selection of which of these techniques to use is controlled by a processor running software, such that a particular interference mitigation technique may be selected based on the current operational and environmental conditions.

Hadamard Noise Floor Inspection

The present invention also provides for generating more Hadamard codes than used in a conventional multiple-input, multiple-output (MIMO) radar system. The unused codes may be correlated to the received signal to determine the interference level of the current scan. This is possible because all of the transmitted codes should be orthogonal to the extra code. Any rise in the noise floor will be from other radars transmitting at different center frequencies and/or different codes. This can be used to determine if a scan abort or other counter measures will be needed to be deployed.

Adaptive Transmission and Interference Cancellation for MIMO Radar

As discussed in detail in U.S. patent application, Ser. No. 15/481,648, filed Apr. 7, 2017, now U.S. Pat. No. 9,689,967, which is hereby incorporated by reference herein in its entirety, an exemplary MIMO radar system has different modes of operation. In one mode the radar operates as a SIMO system utilizing one antenna at a time. Codes with excellent autocorrelation properties are utilized in this mode. In another mode the radar operates as a MIMO system utilizing all the antennas at a time. Codes with excellent cross correlation properties are utilized in this mode. Interference cancellation of the non-ideal autocorrelation side lobes when transmitting in the MIMO mode are employed to remove ghost targets due to unwanted side lobes.

There are several types of signals used in radar systems. One type of radar signal is known as a frequency modulated continuous waveform (FMCW). In this system the transmitter of the radar system transmits a continuous signal in which the frequency of the signal varies. This is sometimes called a chirp radar system. At the receiver a matched filter can be used to process the received signal. The output of the matched filter is a so-called "pulse compressed" signal with a pulse duration inversely proportional to the bandwidth used in the chirp signal.

Another radar signal is known as a phase modulated continuous waveform (PMCW). In this system the phase of the transmitted signal is changed according to a certain pattern or code also known at the radar receiver. The faster the phase is changed, the wider the bandwidth of the transmitted signal. This is sometimes called spread-spectrum because the signal power is spread over a wide bandwidth. At the receiver a matched filter is used that produces a so-called pulse compressed signal as well with time resolution proportional to the inverse bandwidth of the transmitted signal. Codes with good autocorrelation values are important in phase modulated continuous wave radars.

Radars with a single transmitter and single receiver can determine distance to a target but cannot determine the direction of a target. To achieve angular information either multiple transmitters or multiple receivers or both are needed. The larger number of transmitters and receivers, the better resolution possible. A system with multiple transmitters and multiple receivers is also called a multiple-input, multiple-output or MIMO system. One method of canceling out self-interference is to generate a replica of each spreading code at the receiver. This signal is then used as an input to an FIR filter that will reconstruct the received signal corresponding to the transmitted signal of user i. By just inverting this signal and adding it to the input of the filter matched to the j-th transmitted signal, the i-th transmitted signal will be automatically removed. By updating the taps of the FIR filter as the vehicle moves, the interference will be significantly reduced.

Implementing the FIR filter can also be done in the frequency domain by taking the FFT of the replica of the spreading code of user i, processing it (multiplying) with the FFT of the spreading code of user j and then further multiplying it by the known channel characteristics. As such, the part of the received signal due to user i can be recreated at the receiver attempting to process user j's signal. Once recreated, this signal can be used to cancel out the signal of user i. Note that the generation of the correlation between the signal of user i and that of user j can be used at all the receivers but only needs to be generated once. The benefit of this approach is that codes that have good autocorrelation but potential poor cross correlation will not cause a problem with the system. As such a search for codes with good autocorrelation (such as m-sequences, APAS sequences) would be sufficient.

The present invention provides a method of using MIMO radar in which the transmitted signal adapts based on the current knowledge of targets. At turn on, with no knowledge of the targets, the radar will use one antenna at a time (SIMO mode). A sequence with excellent autocorrelation properties (e.g., m-sequences, APAS sequences, Golay sequences, and the like) is employed initially by a single transmitter. The recovered signal is processed to determine a coarse range estimate and possibly a Doppler estimate for each target. This might involve a combination of coherent integration and noncoherent integration depending on the range of Dopplers anticipated. Each of the individual antennas is sequentially used.

After each of the transmitters has been used once and coarse knowledge of range is available, then the system switches to MIMO mode in which all transmitters are used simultaneously. In this mode sequences with good cross correlation are utilized. The nonideal properties of the autocorrelation of these sequences, can be neutralized by interference cancellation techniques. One embodiment uses m-sequences for the SIMO mode and uses a combination of m-sequences and Hadamard codes for the MIMO mode. Another embodiment uses APAS codes for the initial sequences and a combination of Hadamard codes and APAS codes for the MIMO mode. A third embodiment uses Golay codes (with QPSK) for the SIMO mode and Hadamard codes for the MIMO mode. Different interference cancellation techniques can be employed for the MIMO mode to eliminate (or reduce) the interference from side lobes of the autocorrelation of the sequences.

These techniques are controlled by a processor running software that allows the radar system to dynamically adapt to the environment, the desired performance criteria, and external inputs.

Improving Processing Gain by shifting the Doppler Estimation

Radar velocity estimation resolution can be improved, as described in U.S. provisional application, Ser. No. 62/327,016, which is hereby incorporated by reference herein in its entirety. An automotive radar requires the ability to discriminate targets moving at a relative velocity of −250 kph to +500 kph. The hardware detector that processes the Doppler frequency shift created by the relative velocity of the target is usually built as a symmetrical system, designed to handle relative velocities from −500 kph to +500 kph. As a consequence, the signal processing calculations treating the range from −500 kph to −250 kph is wasted (since it is not necessary to process data on an object moving 250 kph or more away from the subject vehicle). The present invention pre-processes the signal entering the Doppler estimator such that the same symmetrical design can treat velocities from −250 kph to +500 kph with no wasted computation cycles on unused velocity ranges.

The preprocessing comprises the steps of: (i) determining, for each sample of the received time-series of complex (In-Phase & Quadrature) samples, the phase shift necessary to produce a required Doppler frequency shift in the output of the Doppler Processing (e.g., FFT or Channelizer), and (ii) multiplying each complex sample of the captured time-series by a matrix to rotate the phase angle by that amount. A significant advantage of this technique is the fact that it effectively improves the Doppler velocity resolution for the same number of accumulated sensed points. Furthermore, if the pre-processing of the data sets is done before the pulse compression engine, compression levels can be increased further for corresponding increased processing gain.

Use of Time-Multiplexed Radar Scans to Reduce HW Overhead and to Enhance Detection Quality The present invention provides for the use of fully reconfigurable radar scans (antenna pattern, frequency, LC, M, N, FFT points, range bin interval and the like) which can be used to focus on different area of interests. This allows the radar to adapt to different scenarios (e.g., parking, vs driving). Different radar scans can also be configured to extend the range by ensuring that one radar scan, for example, one radar scan scans from 0-30 m while another radar scan scans from 30-200 m. Radar scans can also be used to focus on points of interests within the field of view. Different radar scans could also be used to disambiguate between targets, which might have aliased back. The use of different radar scans allows the system to keep the HW (hardware) requirements (e.g., memory) fairly small while being able to adapt to different scenarios or even to focus on certain areas of interest. For different frames, or even within a frame, different radar scans with short and long dwell times can be used.

Another example is that if one radar scan used all 32 virtual receives (VR) with 80 range bins for high angular accuracy and the next one (or more) used just 8 VR with 320 range bins for more distance resolution. This can be combined with another scan for better velocity resolution.

The present invention thus provides flexibility in adjusting radar scans to focus on different areas of interest and to be able to use several range scans to virtually increase the resolution. The adjustment of radar scans is controlled by the processor running software that can dynamically adapt to the environment, the desired performance criteria, and external information.

Radar Data Compression

In a radar system, Doppler processing typically comprises performing a Fast Fourier Transform (FFT), a sufficiently long time series of complex data. This Doppler processing is performed independently on multiple time series, captured simultaneously by multiple virtual receivers for multiple range bins. However, the entire time series must be available before processing can begin. This requires partial time series to be stored in memory as the points of the time series are captured, which can result in a large amount of memory being used. In order to enable longer scans, or scans with more virtual receivers or more range bins, using a limited amount of memory, it is desirable to first compress the time series as they are captured, then store the compressed representations in memory, then once they are fully captured, decompress them prior to performing Doppler processing on them. The compression should be lossless to avoid introducing compression artifacts into the data.

The present invention proposes a method and device for losslessly compressing radar data cube ('RDC1') data prior to performing Doppler processing, by using one or more predictors to reduce the number of bits that are required to represent each complex number of the time series. Data may be optionally converted from complex in-phase and quadrature (I/Q) format to phase angle and magnitude format prior to the prediction step.

After prediction, residual values (the difference between the predicted value and the actual value) are compressed using an arithmetic or entropy encoding algorithm. Within a given range bin, predictors predict samples of data based on the value of samples from adjacent virtual receivers (to either side of the sample being predicted), and from previous time samples for the same virtual receiver. Inter-range bin prediction may also be used.

Compensating for Doppler Shift

Doppler shift has an adverse effect on a radar system's ability to correlate a received signal with various shifts of the transmitted signal to determine range. As the phase of the received signal rotates due to Doppler shift, the magnitude of the zero-shift peak decreases, and the average magnitude of the non-zero-shift "sidelobes" increases. While the former lowers the SNR for the target in question, the latter lowers the SNR for all targets in all other range bins (non-zero shifts). Naturally, largest target(s) cause the largest sidelobes.

The present invention provides a method and device for compensating for Doppler Shift, comprising:
- a. Identifying a set of the largest (highest received signal) targets;
- b. Calculating the central the Doppler velocity for the largest targets:
  - i. Median, weighted arithmetic mean, weighted geometric mean, and the like;
- c. Calculating the phase shift, X, corresponding to said median Doppler velocity; and
- d. Prior to correlation, rotating the phase of the Nth sample of the coherent integration by N*X.

The present invention is a control processing unit that dynamically controls the signal processing described above depending on the environment, the performance criteria, and external information.

An Increased Entropy PRNG

The present invention provides a method to increase the randomness of an algorithmically generated pseudorandom binary (PRB) sequence, for example, LFSR based, where true thermal noise, already present at the quantizer output of the radar receiver, is used. The thermal noise in the radar receiver path is much larger than the size of the LSB of the quantizer present at the backend of the receiver path. As a consequence, the quantizer LSB is switching between 1 and 0 in a truly random fashion. Exemplary implementations use the random nature of the quantizer LSB and imprint it on the algorithmically generated PRB sequence by means of an XOR operation. The entropy can be further improved by using the same XOR operation against the LSBs of all available quantizers in the system. This enables the generating of a code that cannot be predicted and decreases the severity of malicious jammers to only replay attacks that can generate false targets further than the jammer. This also limits the extent and scope of potential false operations due to the jammer.

The random number generator is dynamically controlled by a processor that depends on one or more of the environment, the performance criteria, and external information. Increased Entropy PRNG is also discussed in U.S. Pat. No. 9,575,160, and U.S. provisional application No. 62/327,017, which are hereby incorporated by reference herein in their entireties.

Range Walking/Sub Range Resolution in Analog or Digital Domain on the Transmit and Receive Side In PMCW radar, the chip frequency (i.e., the modulation frequency) determines the range (radial distance) resolution. For example, a 2 GHz chip frequency normally achieves a range resolution of around 7.5 cm. The present invention provides a method and device for Range Walking, and enables a higher range resolution without having to use a higher chip frequency. In order to achieve finer resolutions without increasing the frequency, several consecutive scans are performed, each with a different sub-cycle transmit delay in the code (for example, multiples of ⅟₃₂ of a clock cycle).

On the receive side, correlation is performed with the original (i.e.: not delayed) code sequence. This progressive delay across scans allows closely spaced targets (i.e.: less than one range bin) to be resolved after multiple scans. For example, a multiple of ⅟₃₂ cycle delay with a 2 GHz chip frequency would achieve about 0.25 cm resolution. Range walking is also possible on the receive side with an FIR resampling filter, comprising the steps of operating the Analog to Digital Converter (ADC) at a higher sampling rate than the chip frequency, and using different resampling filters to shift in time the center point of the filter by sub-chip intervals.

Furthermore, combining transmit-side range-walk and receive-side resampling with different relatively prime sub-chip time shifts can be used to give a greater number of subchip delays: for example, range-walk delays of m/M chip (where m is an integer from 0 to M−1) and resampling delays of n/N chip (where n is an integer from 0 to N), where N and M are relatively prime, results in a total of MN different shifts being available to achieve maximum range resolution.

Multi-Chip Radar

In PMCW systems, increasing the number of virtual receivers in each chip can be accomplished by correlating to the transmitters from the other chip(s). This is enabled through the distribution of several signals: start of scan, phase information distributed by means of a clock, and the codes transmitted. For PRBS codes, seeds and taps that are being used can be shared to synchronize the chips, for example, for the codes transmitted. If these chips are in close proximity (in a same housing), they can be assumed to be a single system and increases the VR functionality. When the chips are located in a separate housing, long base line interferometry and triangulation is used for additional angular resolution. For example, the chip of the system of the present invention may include, for example, 12 transmitters (Tx) and 8 receivers (Rx), and the system can use 12 Tx from the other chip, as long as the transmitters are phase aligned, and the system knows the PRN sequence which is being transmitted from the other chip. For the one chip this would look like the system is using 24 Tx and 8 Rx (192 Virtual Receivers)—the same applies for the other chip—so instead of 2×96 VRs, the system actually gets 2×192 VRs with two chips. This can of course scale assuming the different chips have the HW to deal with the additional virtual receives.

Antenna Switches

The present invention also provides for the use of antenna switches to increase the number of Virtual Receivers/angular resolution as well as to adapt to different antenna patterns (e.g., for LRR vs parking radar). The use of antenna switches on either the transmitter or receiver allows a single radar chip to time-multiplex different antenna patterns and perform radar scans, e.g., for long range radar and short range radar with different antenna characteristics. The use of antenna switches also allows an interleaved antenna mode, which can be used for additional spatial resolution.

The control of the antenna switches is accomplished by a control processing unit that dynamically adapts to factors including the environment, the desired performance criteria, and external information.

Method to Pulse PMCW Radar and Power Shape

In a PMCW radar, auto-correlation of code sequences is used to measure range to targets. When using codes that do not have perfect (zero valued) off-peak auto-correlation, a vehicle's bumper (through which an automotive radar must typically operate) as well as large nearby targets, can cause large side lobes in all the range bins. These side lobes are detrimental to good radar performance as they can easily hide smaller targets, especially at greater ranges.

The present invention proposes a method and device for eliminating or reducing the adverse effect of very close reflectors by alternating between transmit-only operation and receive-only operation, optionally with a short delay (Q) between transmitting and receiving. In one embodiment, a maximum range of interest is selected, and one round trip time of the signal (at the speed of light) from the radar to the target and back to the radar is used as the pulse length (T). For a period of time T-Q, the transmitter transmits a code sequence (with the receiver turned off). Then the transmitter is turned off for time Q. Next, the receiver is turned on for time T. Then the pattern is repeated. The effect of this scheme is that the receiver does not receive any signal from nearby targets for which the round-trip time is less than Q. Furthermore, the receiver receives the maximum signal from targets at the maximum distance (i.e., for time T-Q). For a target at an intermediate distance, the time during which the receiver receives a signal from said target is proportional to the distance (i.e., the greater the distance, the more time the signal is received).

In another embodiment, the transmit power is continuously adjusted during the transmit period (T-Q) as follows: at the beginning of the period, maximum transmit power is used, whereas at the end of the period, zero (or minimal) transmit power is used. Various power curves (power vs. time) can be implemented. For example $((T-t)/T)^3$, where "t" goes from 0 to T, will negate the effect of range in the Radar Equation (i.e., $K/R^4$), resulting in equal received power for equal sized targets at different ranges (up to the maximum range of interest). Such pulsed and power shaped RF signals are discussed in detail in U.S. patent application, Ser. No. 15/292,755, filed Oct. 13, 2016, now U.S. Pat. No. 9,753,121, which is hereby incorporated by reference herein in its entirety.

FIR Down-Sampling

In the receive side processing for a PMCW radar, it is desirable to be able to change the chip (phase modulation) frequency without having to change the actual analog clock frequency, which typically requires significant time to change. The present invention proposes a method and device for down-sampling from a fixed sampling frequency to a lower modulation frequency, for example, to 500 Mhz from 2 GHz, comprising the steps of running the Analog to Digital Converter (ADC) at a fixed frequency, greater-than-or-equal to the modulation frequency, and filtering samples from the ADC to produce samples at a lower modulation frequency. Optionally, an FIR filter is used to perform the filtering.

Quiet/Delay Buffer

The switching of the digital components on the chip can cause additional noise levels, which preferably is removed especially if looking for objects relatively far away. In order to do that the system of the present invention can limit the digital components by storing the incoming data from the analog section in a buffer and processing that data a little bit delayed after all the important information is received. This ensures that the system can limit the digital noise to improve the signal-to-noise ratio especially when the system is trying to detect far objects.

The quiet buffer can also be used as a delay buffer, e.g., the incoming signal can be stored at 2 GHz while the processing can be performed at 1 GHz.

A Quiet buffer/delay buffer can be used to quiet down the chip while receiving the return from far objects as well as used to reduce frequency requirements on the digital components.

Power Shaping of Single Antenna

The present invention provides for the use of a multiple strip or slot antenna arrays, which makes it possible to create an antenna power shape that will cover both long, medium and short range targets. This is accomplished through constructive and destructive interference of two or more candelabra arrays. This reduces hardware requirements by 2-3× over deployed embodiments.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for operating a radar sensing system, the method comprising:
    configuring at least one of a plurality of transmitters to transmit modulated continuous-wave radio signals;
    configuring at least one of a plurality of receivers to receive radio signals, wherein the received radio signals include the transmitted radio signals transmitted by the plurality of transmitters and reflected from objects in the environment; and
    selectively modifying one or more operational parameters of at least one of the transmitters and at least one of the receivers, wherein the selected operational parameter is modified to meet changing operational requirements of the radar sensing system, wherein modifying operational parameters comprises modifying how the at least one transmitter processes radio signals for transmission and how the at least one receiver processes received radio signals, and wherein the modified operational parameters of the at least one transmitter are not dependent upon the modified operational parameters of the at least one receiver.

2. The method of claim 1, wherein the changing operational requirements are defined at least in part by changing environmental and situational conditions.

3. The method of claim 1 further comprising converting the received radio signals into digital signals, and storing the digital signals in a memory, wherein the digital signals stored in the memory are digitally processed, and wherein for at least a portion of the time the digital signals are stored in the memory, digital processing is suspended.

4. The method of claim 1 further comprising digitally processing, with a digital front end, the received radio signals, wherein the digital processing is adapted to changes in an operational area, changing range, velocity, and/or angular resolution objectives, and changing types of radio interference.

5. The method of claim 1 further comprising shifting a carrier frequency of the transmitter and monitoring a magnitude of a received self-interfering radio signal for the purpose of minimizing the latter, wherein a frequency versus reflectivity is determined and used to define the frequency shift, and wherein the frequency shift mitigates self-interference caused by the received self-interfering radio signal.

6. The method of claim 1 further comprising compensating for shifting gain and phase inaccuracies in I/Q channel signal processing by adjusting input data fed to an I/Q correction module to correct an I/Q mismatch caused by the gain/phase inaccuracies, and wherein the I/Q phase mismatch is corrected utilizing correlation values, input from an analog processing system of the receiver, and adjusted correlator output values.

7. The method of claim 1 further comprising selectively coupling ones of a plurality of antennas to each respective receiver of the plurality of receivers, and wherein a quantity of receivers is different from a quantity of antennas.

8. The method of claim 7 further comprising dynamically selecting a quantity of virtual receivers to isolate an interfering radio signal into an angle.

9. The method of claim 7 further comprising dynamically selecting a quantity of virtual receivers for a desired angular resolution as defined by current operational conditions and current antenna configurations.

10. The method of claim 7 further comprising selecting one of a plurality of antenna configurations, as defined by a desired antenna pattern for the current operational conditions.

11. The method of claim 1, wherein the modulated continuous-wave radio signals are defined by selected ones of a plurality of codes, wherein the method further comprises using code values of the plurality of codes, in combination with a bank of digital finite impulse response (FIR) filters, generating complementary signals of any self-interference noise, wherein the code values used are selected as defined by the selected ones of the plurality of codes used to modulate the transmitted radio signal; and subtracting the complementary signals at one or more points in the receiver prior to the interference saturating the receiver.

12. The method of claim 11, wherein the code values used in the generation of complementary signals are defined by advanced temporal knowledge of the selected ones of the plurality of codes used to modulate the transmitted radio signal.

13. The method of claim 11, wherein the modulation is phase modulation, as defined by the plurality of codes.

14. A method for operating a radar sensing system, the method comprising:
configuring a transmitter to transmit modulated continuous-wave radio signals;
configuring a receiver to receive radio signals, wherein the received radio signals include the transmitted radio signals transmitted by the transmitter and reflected from objects in the environment; and
selectively modifying one or more operational parameters of the transmitter and the receiver, wherein the selected operational parameter is modified to meet changing operational requirements of the radar sensing system, wherein modifying operational parameters comprises modifying how the transmitter processes radio signals for transmission and how the receiver processes received radio signals, and wherein the modified operational parameters of the transmitter are not dependent upon the modified operational parameters of the receiver.

15. The method of claim 14, wherein the changing operational requirements are defined at least in part by changing environmental and situational conditions.

16. The method of claim 14 further comprising converting the received radio signals into digital signals, and storing the digital signals in a memory, wherein the digital signals stored in the memory are digitally processed, and wherein for at least a portion of the time the digital signals are stored in the memory, digital processing is suspended.

17. The method of claim 14 further comprising digitally processing, with a digital front end, the received radio signals, wherein the digital processing is adapted to the changing operational area, changing range, velocity, and/or angular resolution objectives, and changing types of radio interference.

18. The method of claim 14 further comprising shifting a carrier frequency of the transmitter and monitoring a magnitude of a received self-interfering radio signal for the purpose of minimizing the latter, wherein a frequency versus reflectivity is determined and used to define the frequency shift, and wherein the frequency shift mitigates self-interference caused by the received self-interfering radio signal.

19. The method of claim 14 further comprising compensating for an I/Q phase mismatch, wherein compensating for an I/Q phase mismatch comprises configuring an I/Q correction module to correct the I/Q mismatch, and wherein the I/Q phase mismatch is corrected utilizing correlation values, input from an analog processing system of the receiver, and correlator output values.

* * * * *